United States Patent [19]
Arakawa et al.

[11] Patent Number: 6,039,893
[45] Date of Patent: Mar. 21, 2000

[54] GUEST-HOST LIQUID CRYSTAL DISPLAY DEVICE AND GUEST-HOST LIQUID CRYSTAL COMPOSITION

[75] Inventors: Seiichi Arakawa; Masataka Matsute, both of Kanagawa; Yasutoshi Kawate, Tokyo, all of Japan

[73] Assignee: Sony Corporation, Tokyo, Japan

[21] Appl. No.: 09/012,014

[22] Filed: Jan. 22, 1998

[30] Foreign Application Priority Data

Jan. 24, 1997 [JP] Japan .................................. 9-026183

[51] Int. Cl.$^7$ ............................. C09K 19/60; C09K 19/52
[52] U.S. Cl. .................. 252/299.01; 349/165; 252/299.1
[58] Field of Search .............................. 252/299.1, 299.4, 252/299.01; 349/165

[56] References Cited

U.S. PATENT DOCUMENTS

| | | | |
|---|---|---|---|
| 4,959,172 | 9/1990 | Miura et al. | 252/299.1 |
| 5,751,389 | 5/1998 | Andreatta et al. | 349/97 |

FOREIGN PATENT DOCUMENTS

| | | |
|---|---|---|
| 57-108828 | 7/1982 | Japan . |
| 58-142968 | 8/1983 | Japan . |
| 62-79271 | 4/1987 | Japan . |

*Primary Examiner*—Shean C. Wu
*Attorney, Agent, or Firm*—Hill & Simpson

[57] ABSTRACT

A guest-host liquid crystal display device comprises a pair of substrates opposing each other with a space therebetween, a guest-host liquid crystal held in the space, the guest-host liquid crystal containing a dichroic dye mixture exhibiting a black color as a whole, and electrodes provided on the substrates for applying a voltage to the guest-host liquid crystal. The dichroic dye mixture comprises a bis-azo blue dye having a thienothiazole ring represented by the following chemical formula (1) and a tris-azo bluish purple dye having a benzothiazole ring represented by the following chemical formula (2):

wherein $R_1$ is a hydrogen or halogen atom, $C_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; each of $R_2$ and $R_3$ is a hydrogen atom or $C_nH_{2n+1}$; $R_3$ may be $$CH_2-\!\!\!\!\!\bigcirc\!\!\!\!\!-OC_mH_{2m+1},$$

or $$CH_2-\!\!\!\!\!\bigcirc\!\!\!\!\!-C_nH_{2m+1},$$

and a combination of $R_2$ and $R_3$ may form wherein n is an integer from 1 to 8, and m is an integer from 1 to 5; and $R_4$ is a hydrogen or halogen atom, or $C_nH_{2n+1}$, wherein n is an integer from 1 to 8.

22 Claims, 35 Drawing Sheets

FIG. 3

| CHEMICAL FORMULA | $\lambda_{max}$ (nm) | DICHROIC RATIO |
|---|---|---|
| $C_4H_9$—⟨O⟩—N=N—[thienothiazole]—N=N—⟨naphthyl⟩—N(H)(C_2H_5) | 660 | 11.7 |
| $C_4H_9$—⟨O⟩—N=N—[thienothiazole]—N=N—⟨naphthyl⟩—N(H)(C_8H_{17}) | 661 | 10.1 |
| $C_8H_{17}$—⟨O⟩—N=N—[thienothiazole]—N=N—⟨naphthyl⟩—N(H)(C_4H_9) | 663 | 10.3 |
| $C_4H_9$—⟨O⟩—N=N—[thienothiazole]—N=N—⟨naphthyl⟩—N(C_2H_5)(C_2H_5) | 637 | 9.6 |
| $C_5H_{11}O$—⟨O⟩—N=N—[thienothiazole]—N=N—⟨naphthyl⟩—N(C_8H_{17})(C_8H_{17}) | 640 | 9.4 |
| $C_7H_{15}OC(=O)$—⟨O⟩—N=N—[thienothiazole]—N=N—⟨naphthyl⟩—N(C_5H_{11})(C_5H_{11}) | 656 | 9.2 |
| $CH_3C(=O)$—⟨O⟩—N=N—[thienothiazole]—N=N—⟨naphthyl⟩—N(C_2H_5)(C_2H_5) | 658 | 10.2 |
| $C_4H_9$—⟨O⟩—N=N—[thienothiazole]—N=N—⟨naphthyl⟩—N(CH_5)(CH_2—⟨O⟩—OCH_3) | 646 | 10.3 |
| $C_6H_{13}OC(=O)$—⟨O⟩—N=N—[thienothiazole]—N=N—⟨naphthyl⟩—N(H)(CH_2—⟨O⟩—OC_5H_{11}) | 674 | 11.1 |
| $C_3H_7O$—⟨O⟩—N=N—[thienothiazole]—N=N—⟨naphthyl⟩—N⟨H] | 643 | 10.1 |

FIG. 4
A [YELLOW] 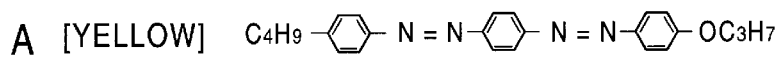
B [ORANGE] 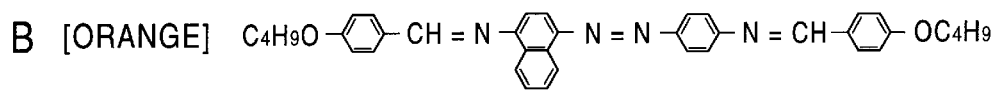
C [RED] 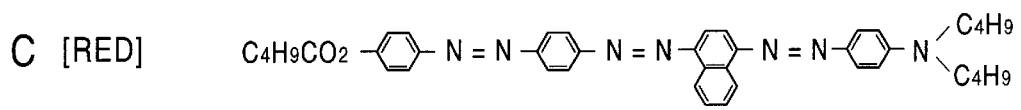
D [BLUE] 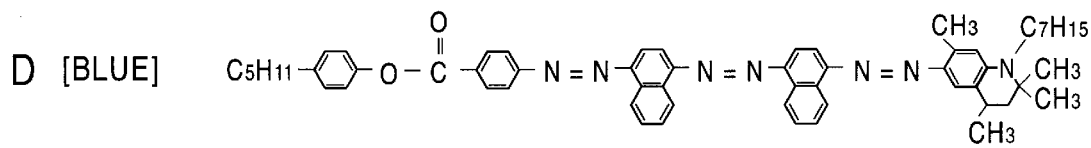

FIG. 6
E [ORANGE] 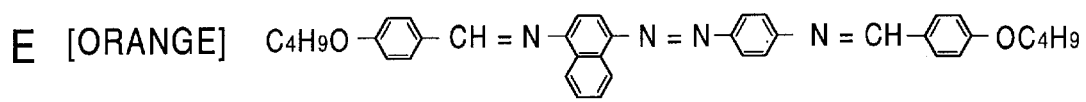
F [RED] 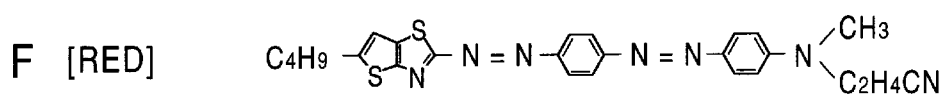
G [BLUISH PURPLE] 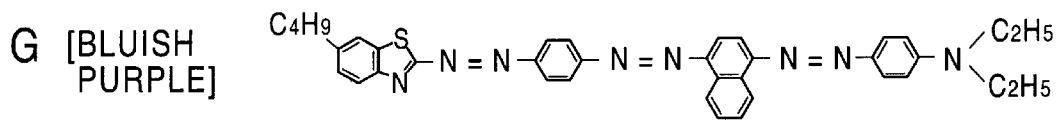
H [BLUE] 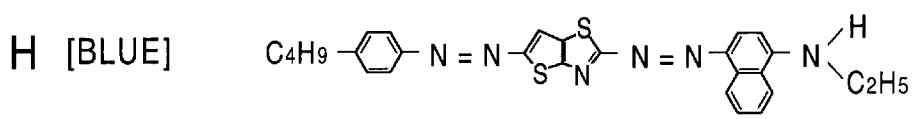

FIG. 12
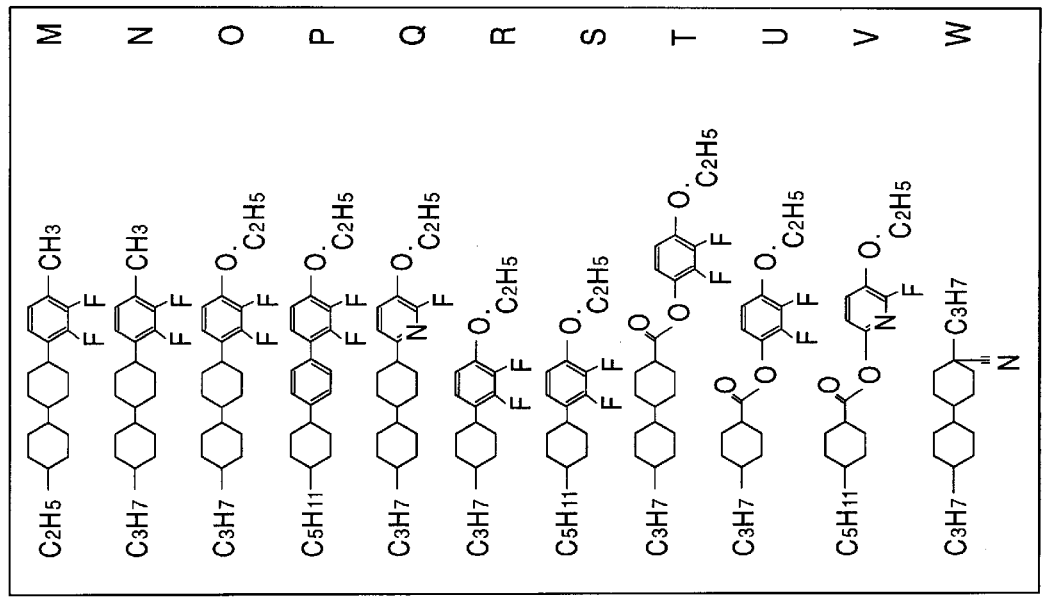
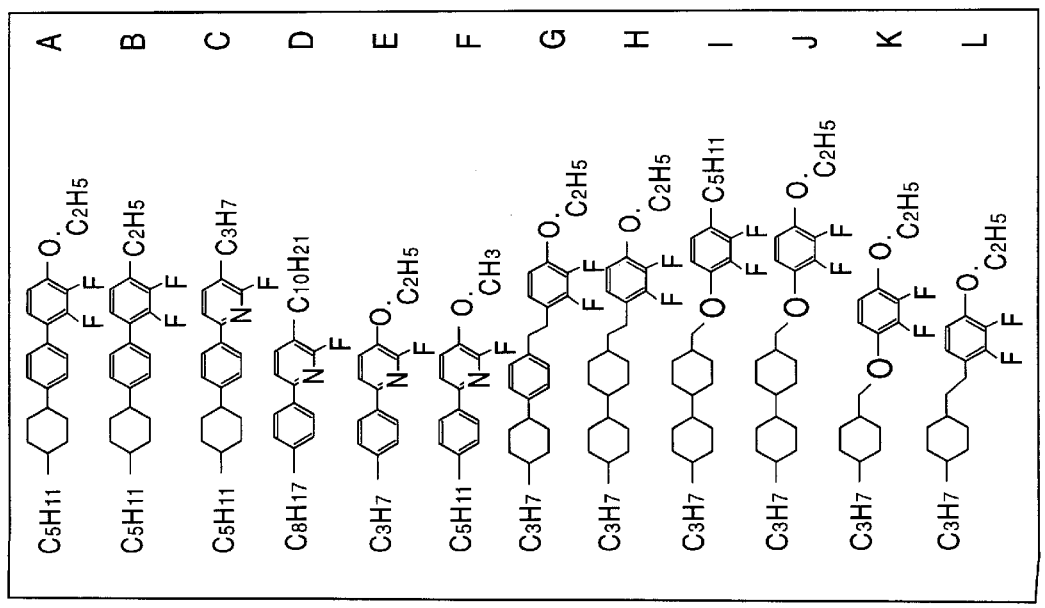

FIG. 18
(8) 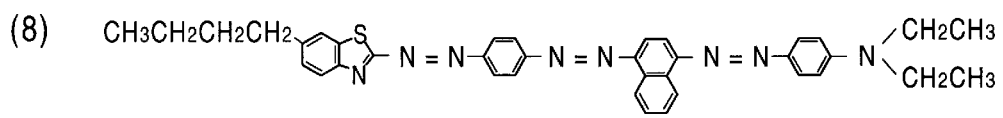
(9) 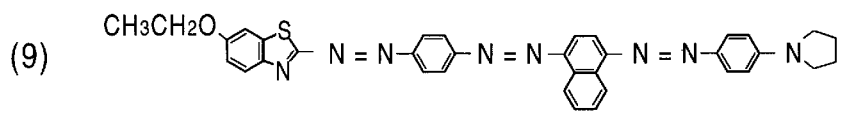
(10) 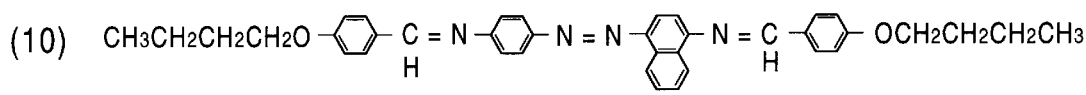
(11) 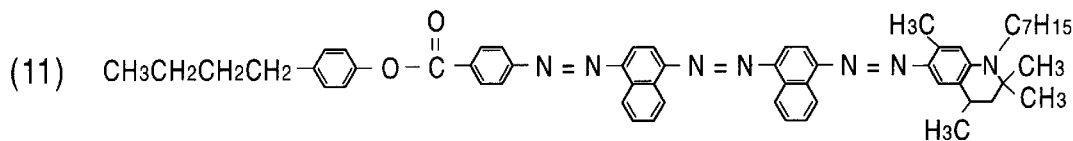
(12) 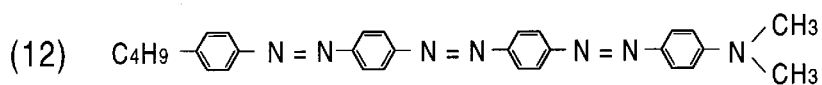
(13) 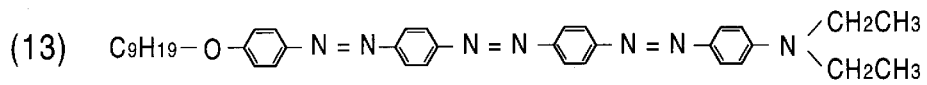
(14) 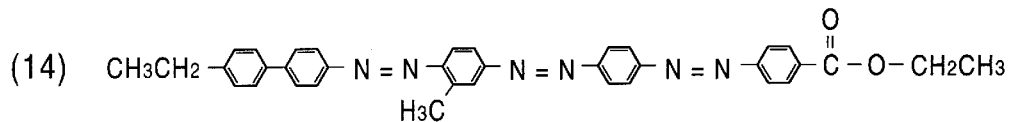

FIG. 31

| CHEMICAL FORMULA | $\lambda_{max}$ (nm) | DICHROIC RATIO |
|---|---|---|
| $C_4H_9$–⟨O⟩–N=N–[thienothiazole]–N=N–⟨naphthyl⟩–N(H)($C_2H_5$) | 660 | 11.7 |
| $C_4H_9$–⟨O⟩–N=N–[thienothiazole]–N=N–⟨naphthyl⟩–N(H)($C_8H_{17}$) | 661 | 10.1 |
| $C_6H_{17}$–⟨O⟩–N=N–[thienothiazole]–N=N–⟨naphthyl⟩–N(H)($C_4H_9$) | 663 | 10.3 |
| $C_4H_9$–⟨O⟩–N=N–[thienothiazole]–N=N–⟨naphthyl⟩–N($C_2H_5$)($C_2H_5$) | 637 | 9.6 |
| $C_5H_{11}O$–⟨O⟩–N=N–[thienothiazole]–N=N–⟨naphthyl⟩–N($C_8H_{17}$)($C_8H_{17}$) | 640 | 9.4 |
| $C_7H_{15}OC(=O)$–⟨O⟩–N=N–[thienothiazole]–N=N–⟨naphthyl⟩–N($C_5H_{11}$)($C_5H_{11}$) | 656 | 9.2 |
| $CH_3C(=O)$–⟨O⟩–N=N–[thienothiazole]–N=N–⟨naphthyl⟩–N($C_2H_5$)($C_2H_5$) | 658 | 10.2 |
| $C_4H_9$–⟨O⟩–N=N–[thienothiazole]–N=N–⟨naphthyl⟩–N($CH_5$)($CH_2$–⟨O⟩–$OCH_3$) | 646 | 10.3 |
| $C_6H_{13}OC(=O)$–⟨O⟩–N=N–[thienothiazole]–N=N–⟨naphthyl⟩–N(H)($CH_2$–⟨O⟩–$OC_5H_{11}$) | 674 | 11.1 |
| $C_3H_7O$–⟨O⟩–N=N–[thienothiazole]–N=N–⟨naphthyl⟩–N(H) | 643 | 10.1 |

FIG. 32

| CHEMICAL FORMULA | $\lambda_{max}$ (nm) | DICHROIC RATIO |
|---|---|---|
| $C_2H_5O$-[benzothiazole]-N=N-[phenyl]-N=N-[naphthyl]-N=N-[naphthyl]-N($C_2H_5$)($C_2H_5$) | 573 | 10.2 |
| $C_2H_5O$-[benzothiazole]-N=N-[phenyl]-N=N-[naphthyl]-N=N-[phenyl]-N($C_2H_5$)($C_2H_5$) | 600 | 10.0 |
| [benzothiazole]-N=N-[phenyl]-N=N-[naphthyl]-N=N-[phenyl]-N($C_2H_5$)($C_2H_5$) | 605 | 10.2 |
| $n$-$C_4H_9$-[benzothiazole]-N=N-[phenyl]-N=N-[naphthyl]-N=N-[phenyl]-N($C_2H_5$)($C_2H_5$) | 606 | 10.9 |
| $C_2H_5O$-[benzothiazole]-N=N-[phenyl]-N=N-[naphthyl]-N=N-[phenyl]-N(pyrrolidine) | 602 | 11.8 |
| $n$-$C_7H_{15}$-[benzothiazole]-N=N-[phenyl]-N=N-[naphthyl]-N=N-[phenyl]-N(pyrrolidine) | 607 | 12.5 |

FIG. 33

| CHEMICAL FORMULA | $\lambda_{max}$ (nm) | DICHROIC RATIO |
|---|---|---|
| n-$C_4H_9$—[thienothiazole]—N=N—[phenyl]—N=N—[phenyl]—N($C_2H_5$)($C_2H_5$) | 572 | 9.8 |
| n-$C_6H_{13}$—[thienothiazole]—N=N—[phenyl]—N=N—[phenyl]—N($C_2H_5$)($C_2H_5$) | 572 | 9.8 |
| [phenyl]—$CH_2$—[thienothiazole]—N=N—[phenyl]—N=N—[phenyl]—N($C_2H_5$)($C_2H_5$) | 573 | 8.6 |
| n-$C_3H_7$—[thienothiazole]—N=N—[naphthyl]—N=N—[phenyl]—N($C_2H_5$)($C_2H_5$) | 623 | 8.7 |
| n-$C_4H_9$—[thienothiazole]—N=N—[naphthyl]—N=N—[phenyl]—N($C_2H_5$)($C_2H_5$) | 626 | 8.4 |
| [phenyl]—$CH_2$—[thienothiazole]—N=N—[naphthyl]—N=N—[phenyl]—N($C_2H_5$)($C_2H_5$) | 637 | 7.0 |
| $C_4H_9$—[thienothiazole]—N=N—[phenyl]—N=N—[phenyl]—N($CH_3$)($C_2H_4CN$) | 545 | 7.8 |

FIG. 34
A [YELLOW] 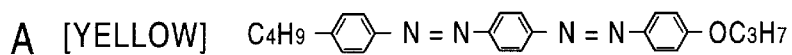
B [YELLOW] 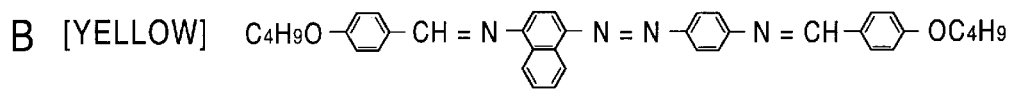
C [RED] 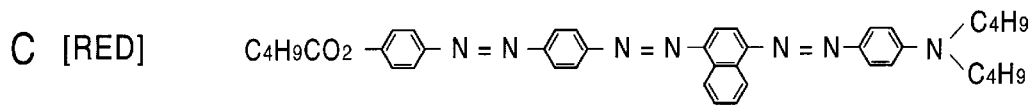
D [BLUE] 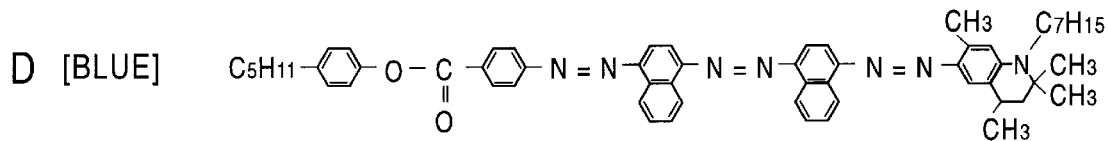

FIG. 35
E [YELLOW] 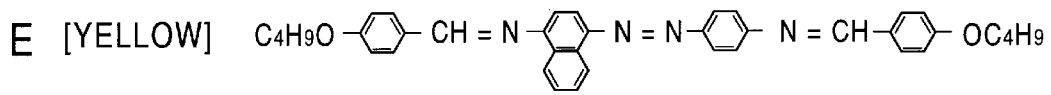
F [RED] 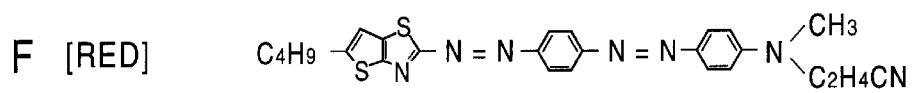
G [BLUISH PURPLE] 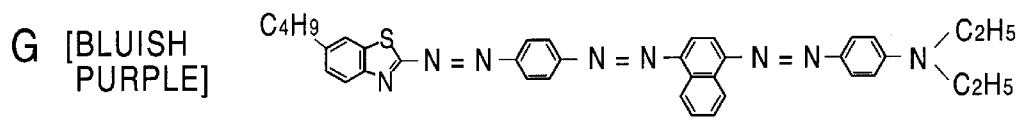
H [BLUE] 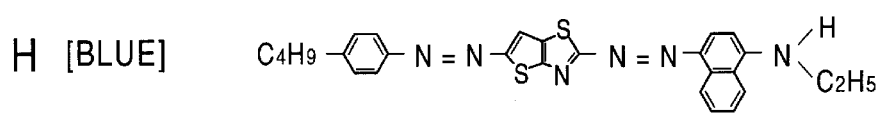

FIG. 36
I [REDDISH PURPLE] 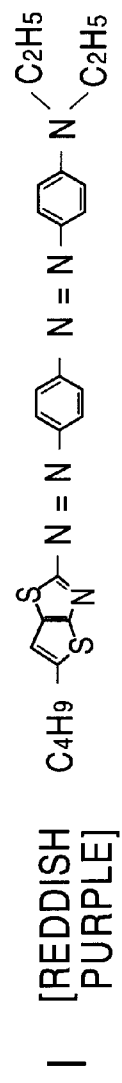
J [YELLOW] 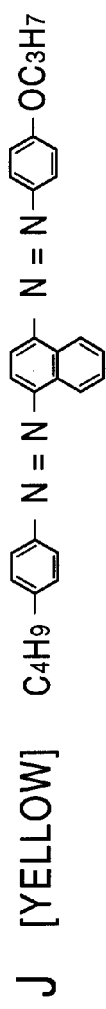
K [RED] 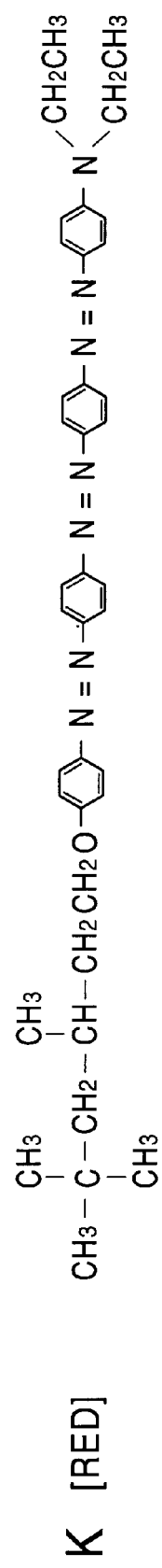

GUEST-HOST LIQUID CRYSTAL DISPLAY DEVICE AND GUEST-HOST LIQUID CRYSTAL COMPOSITION

BACKGROUND OF THE INVENTION

1. Field of the Invention

The present invention relates to guest-host liquid crystal display devices. Particularly, the present invention relates to a composition of dichroic dye which is added as a guest to a nematic liquid crystal functioning as a host.

2. Description of the Related Art

A guest-host liquid crystal display devices includes a nematic liquid crystal and dichroic dye dissolved in the nematic liquid crystal, in which alignment of the dichroic dye, as well as the nematic liquid crystal, is controlled by an applied electric field. Such dichroic dye shows anisotropic light absorption, and light transmittance of a liquid crystal display device is controlled by such a phenomenon. Guest-host liquid crystal display devices are classified into a transmitting type and a reflecting type. Dichroic dye showing a black color is used for monochrome displaying of black and white in these two types. A combination of the guest-host liquid crystal display device and a micro color filter provides a full color guest-host liquid crystal display device. Accordingly, the dichroic dye must be a black dye suitable for monochrome displaying. It is, however, difficult to achieve monochrome displaying with only one dye, hence a mixed-type black dye composed of different color dyes is generally used. The requirements for dichroic dye include (1) high dichroic ratio, (2) large absorption coefficient, and (3) high compatibility with or solubility in liquid crystals. A higher dichroic ratio causes a higher contrast because of high anisotropy in light absorption. A higher absorption coefficient enables a sufficiently high contrast with a small amount of dichroic dye. Further, a higher solubility of dichroic dye in the liquid crystal enables a satisfactorily high contrast even at a lower temperature, since it barely precipitates at a lower temperature.

Black dyes are prepared by mixing, for example, yellow dyes, orange dyes, red dyes, bluish purple dyes and blue dyes. Among these dyes, there are many types of yellow dyes, orange dyes and red dyes, and some of them satisfy the above-mentioned three requirements. In contrast, only a few bluish purple dyes and blue dyes have been known, and these bluish purple dyes or blue dyes barely satisfy the three requirements. Bluish purple dyes and blue dyes have absorption bands from about 550 nm to 620 nm for which the human eye is sensitive and thus greatly affect the contrast. Conventionally used bluish purple dyes and blue dyes include tris-azo dyes and anthraquinone dyes. The anthraquinone dyes do not satisfy the absorption coefficient and the compatibility with the liquid crystal among the three requirements. Although the tris-azo dichroic dye has a relatively high balance between these requirements, it is still unsatisfactory in view of practical use. That is, a large amount of tris-azo dichroic dye relative to the liquid crystal is required because of a low absorption coefficient. As a result, the dye easily precipitates as a crystal at a low temperature, and operational characteristics of the liquid crystal deteriorate since the dye functions as an impurity. In recent years, active matrix liquid crystal display devices, in which thin film transistors are used for pixel switching, have been widely used, and such devices require stable operational characteristics.

SUMMARY OF THE INVENTION

It is an object of the present invention to provide a guest-host liquid crystal display device using a black dye mixture having a high dichroic ratio, large absorption coefficient and high compatibility with the liquid crystal.

A first aspect of the present invention is a guest-host liquid crystal display device comprising:

a pair of substrates opposing each other with a space therebetween;

a guest-host liquid crystal held in the space, the guest-host liquid crystal containing a mixture of dichroic dyes exhibiting a black color as a whole; and electrodes provided on the substrates for applying a voltage to the guest-host liquid crystal;

the mixture of dichroic dyes comprising a bis-azo blue dye having a thienothiazole ring represented by the following chemical formula (1) and a tris-azo bluish purple dye having a benzothiazole ring represented by the following chemical formula (2):

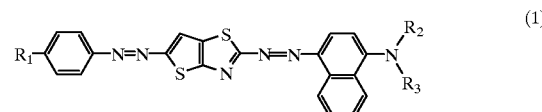

(1)

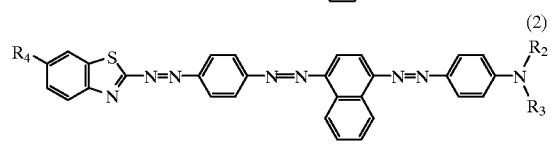

(2)

wherein $R_1$ is a hydrogen or halogen atom, $C_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; each of $R_2$ and $R_3$ is a hydrogen atom or $C_nH_{2n+1}$; $R_3$ may be

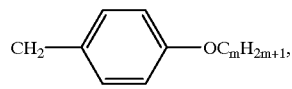

or

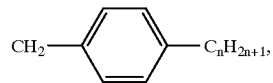

and a combination of $R_2$ and $R_3$ may form

wherein n is an integer from 1 to 8, and m is an integer from 1 to 5; and $R_4$ is a hydrogen or halogen atom, or $C_nH_{2n+1}$, wherein n is an integer from 1 to 8.

Preferably the mixture of dichroic dyes is added to the guest-host liquid crystal in an amount of 1.0 to 5.0 percent by weight.

Preferably, the guest-host liquid crystal comprises a nematic liquid crystal having a negative dielectric anisotropy, and is aligned perpendicularly to the substrates.

The nematic liquid crystal may include, for example, a fluorophenylcyclohexane compound.

Preferably, a first substrate among the substrates is transparent and lies at the incident side, and a second substrate faces the first substrate and is provided with a reflecting layer and a quarter-wavelength layer thereon in that order.

A second aspect of the present invention is a guest-host liquid crystal composition comprising:

- a dichroic dye mixture comprising a bis-azo dye having a thienothiazole ring chromophoric group and a tris-azo dye having a benzothiazole chromophoric group; and
- a host liquid crystal dissolving the dichroic dye mixture as a guest substance.

Preferably, the host liquid crystal comprises a nematic liquid crystal having a negative dielectric anisotropy.

Preferably, the nematic liquid crystal comprises a fluorophenylcyclohexane compound showing a nematic phase at room temperature.

A third aspect of the present invention is a guest-host liquid crystal display device comprising:

- a pair of substrates opposing each other with a space therebetween;
- a guest-host liquid crystal held in the space, the guest-host liquid crystal exhibiting a black color as a whole and containing a mixture of dichroic dyes; and
- electrodes provided on the substrates for applying a voltage to the guest-host liquid crystal;
- the mixture of dichroic dyes comprising a dye represented by the following chemical formula (1), a dye represented by the following chemical formula (2), and at least one dye selected from the group consisting of dyes represented by the following general formulae (3), (4) and (5):

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; and B is

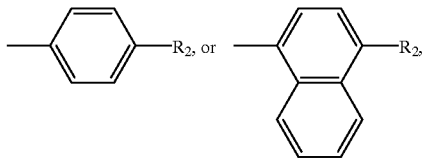

wherein $R_2$ is

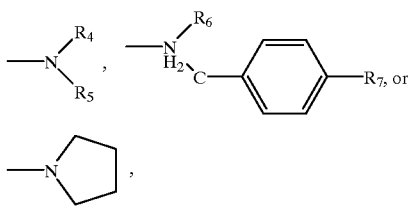

wherein each of $R_4$ and $R_5$ is independently a hydrogen atom, or $C_nH_{2n+1}$, and $R_6$ is a methyl group, and $R_7$ is $C_mH_{2m+1}$, or $OC_mH_{2m+1}$, wherein n is an integer from 1 to 5 and m is an integer from 1 to 8;

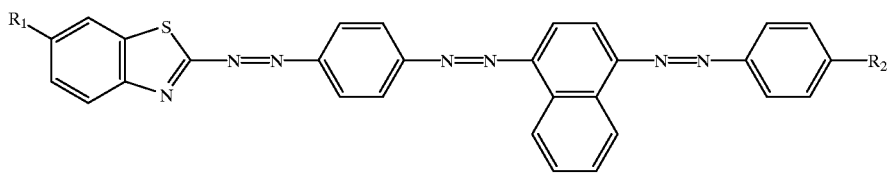

(2)

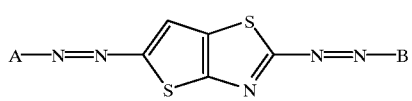

(1)

wherein A is

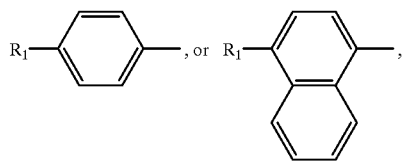

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; and $R_2$ is

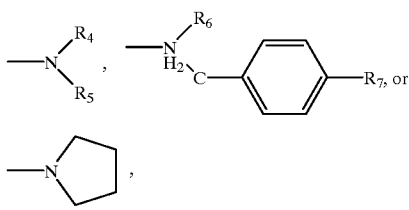

wherein each of $R_4$ and $R_5$ is independently a hydrogen atom or $C_nH_{2n+1}$; $R_6$ is a methyl group; and $R_7$ is $C_mH_{2m+1}$, or $OC_mH_{2m+1}$, wherein n is an integer from 1 to 5, and m is an integer from 1 to 8;

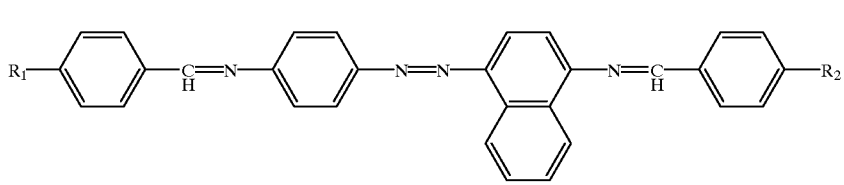

(3)

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2C_nH_{2n+1}$, wherein n is an integer from 1 to 8; and $R_2$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8;

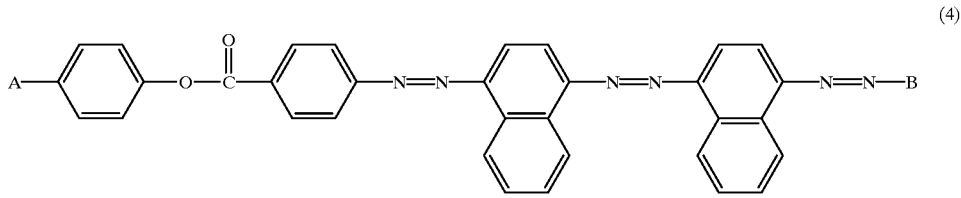

(4)

wherein A is $C_nH_{2n+1}$, or

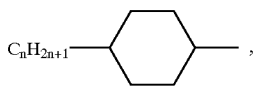, wherein n is an integer from 1 to 8; and B is

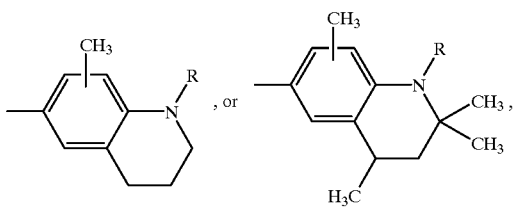

wherein R is $C_nH_{2n+1}$, or $C_nH_{2n}OCH_3$, wherein n is an integer from 1 to 8;

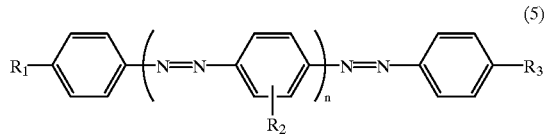

(5)

wherein R1 is $C_nH_{2n+1}$, $OC_nH_{2n+1}$, $COC_nH_{2n+1}$, $OCOC_nH_{2n+1}$, $C_6H_4C_nH_{2n+1}$, $COOC_nH_{2n+1}$, or $CH_2C_nH_{2n+1}$, wherein n is an integer from 1 to 8; $R_2$ is a hydrogen or halogen atom, a linear alkyl group having four or less carbon atoms or a lower alkoxy group; and $R_3$ is

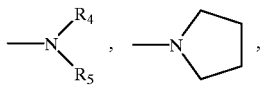

or $-OCOR_6$, wherein each of $R_4$, $R_5$, and $R_6$ is independently a hydrogen atom or $C_nH_{2n+1}$, wherein n is an integer from 1 to 5.

A fourth aspect of the present invention is a guest-host liquid crystal display device comprising:

a pair of substrates opposing each other with a space therebetween;

a guest-host liquid crystal held in the space, the guest-host liquid crystal containing a mixture of dichroic dyes exhibiting a black color as a whole; and electrodes provided on the substrates for applying a voltage to the guest-host liquid crystal;

the mixture of dichroic dyes comprising at least two dyes selected from the group consisting of a bis-azo blue dye having a thienothiazole ring represented by the following chemical formula (1), a tris-azo bluish purple dye having a benzothiazole ring represented by the following chemical formula (2), and a bis-azo reddish purple dye having a thienothiazole ring represented by the following chemical formula (3):

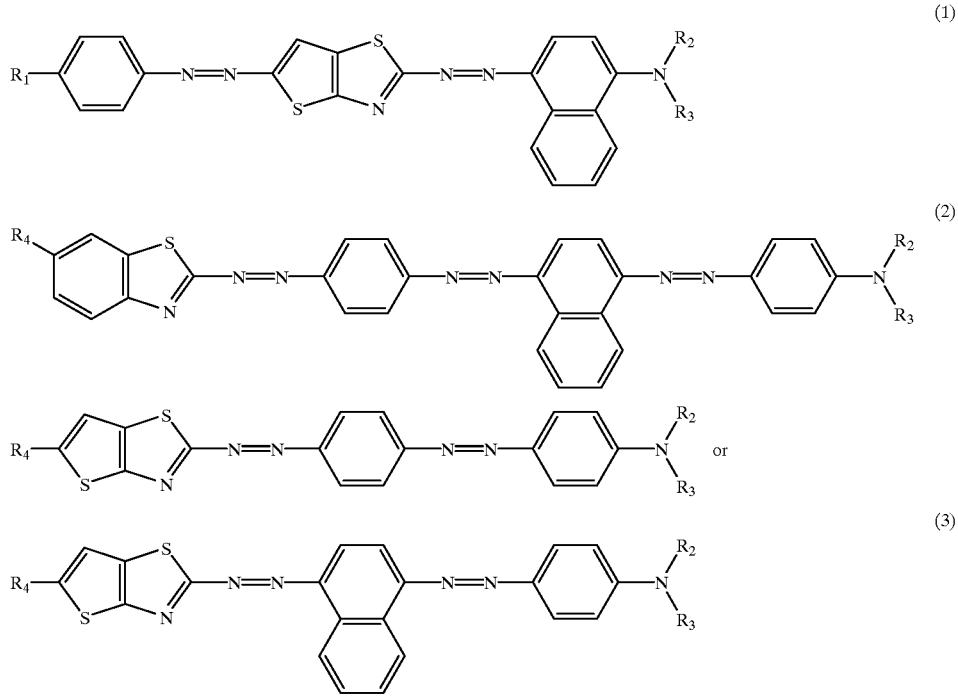

wherein $R_1$ is a hydrogen or halogen atom, $C_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; each of $R_2$ and $R_3$ is a hydrogen atom or $C_nH_{2n+1}$; $R_3$ may be

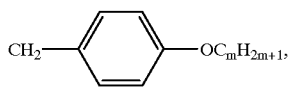

or

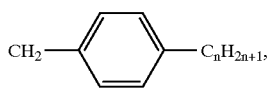

and a combination of $R_2$ and $R_3$ may form

wherein n is an integer from 1 to 8, and m is an integer from 1 to 5; and $R_4$ is a hydrogen or halogen atom, or $C_nH_{2n+1}$, wherein n is an integer from 1 to 8.

A fifth aspect of the present invention is a guest-host liquid crystal composition comprising:

dichroic dyes comprising at least two dyes selected from the group consisting of a bis-azo blue dye having a thienothiazole ring chromophoric group, a tris-azo bluish purple dye having a benzothiazole chromophoric group and a bis-azo reddish purple dye having a thienothiazole ring chromophoric group; and a host liquid crystal dissolving the dichroic dye mixture as a guest substance.

BRIEF DESCRIPTION OF THE DRAWINGS

Preferred embodiments of the present invention will be described with reference to the accompanying drawings, wherein:

FIG. 3 shows chemical formulae of dichroic dyes used in a guest-host liquid crystal display device in accordance with the present invention;

FIG. 4 shows chemical formulae of typical prior art dichroic dyes;

FIG. 6 shows chemical formulae of typical dichroic dyes in accordance with the present invention;

FIG. 12 shows typical nematic liquid crystals used in a guest-host liquid crystal display device in accordance with the present invention;

FIG. 18 shows chemical formulae of various dichroic dyes;

FIG. 31 shows chemical formulae of dichroic dyes used in a guest-host liquid crystal display device in accordance with the present invention;

FIG. 32 shows chemical formulae of some dichroic dyes;

FIG. 33 shows chemical formulae of some dichroic dye;

FIG. 34 shows chemical formulae of typical dichroic dyes in accordance with the present invention;

FIG. 35 shows chemical formulae of dichroic dyes used in Examples in accordance with the present invention;

FIG. 36 shows chemical formulae of dichroic dyes used in Examples in accordance with the present invention;

DESCRIPTION OF THE PREFERRED EMBODIMENTS

Figure 1A:
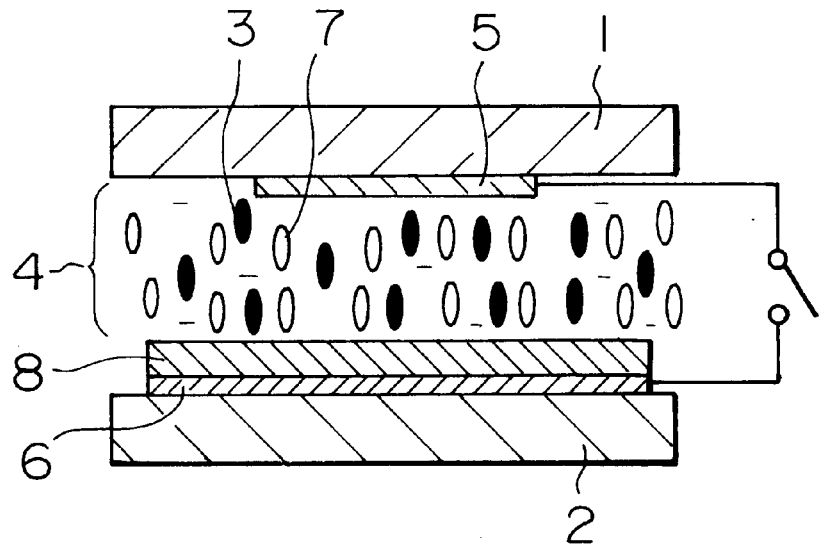
FIGS. 1A and 1B represent a schematic cross-sectional view of a basic configuration of a guest-host liquid crystal display device in accordance with the present invention.
Figure 1B:
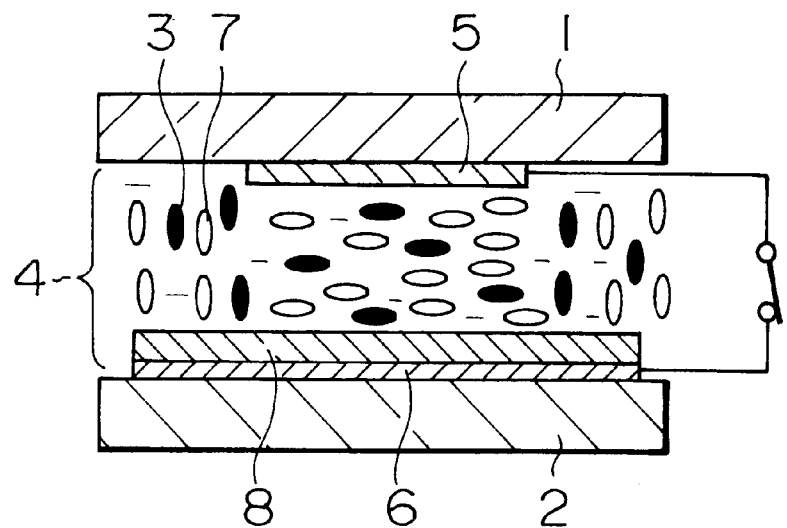

FIGS. 1A and 1B are schematic cross-sectional views of a basic configuration of a guest-host liquid crystal display device in accordance with the present invention. FIG. 1A shows a state where no voltage is applied (off-state), whereas FIG. 1B shows a state where a voltage is applied (on-state). The guest-host liquid crystal display device is provided with a pair of substrates 1 and 2, which oppose each other with a given space therebetween, a guest-host liquid crystal 4 held between the substrates 1 and 2 and containing a dichroic dye mixture 3 which has a black color as a whole, a counter electrode 5 and a reflecting electrode 6 which apply a voltage to the guest-host liquid crystal 4. In the present invention, the dichroic dye mixture is composed of a bis-azo blue dye having a thienothiazole ring and represented by the following chemical formula (1) and a tris-azo bluish purple dye having a benzothiazole ring and represented by the following chemical formula (2), and these dyes are compounded such that the dichroic dye mixture has a black color as a whole in the guest-host liquid crystal 4:

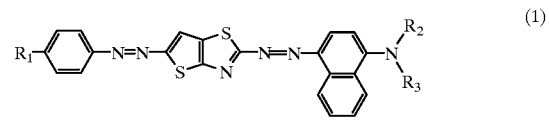

(1)

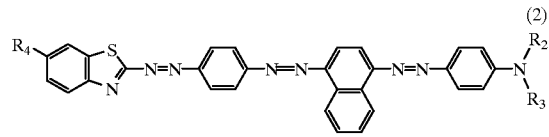

(2)

wherein $R_1$ is a hydrogen or halogen atom, $C_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; each of $R_2$ and $R_3$ is a hydrogen atom or $C_nH_{2n+1}$; $R_3$ may be

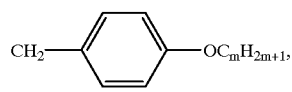

or

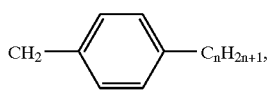

and a combination of $R_2$ and $R_3$ may form

wherein n is an integer from 1 to 8, and m is an integer from 1 to 5; and $R_4$ is a hydrogen or halogen atom, or $C_nH_{2n+1}$, wherein n is an integer from 1 to 8.

It is preferable that the dichroic dye mixture 3 be added to the guest-host liquid crystal 4 in a ratio by weight of 1.0 to 5.0. The dichroic dye mixture 3 of more than 5.0 percent by weight will cause precipitation due to crystallization at a low temperature and adversely affect electro-optical characteristics. On the other hand, the dichroic dye mixture 3 of less than 1.0 percent by weight will cause a low contrast due to low light absorption. Preferably, the guest-host liquid crystal 4 comprises nematic liquid crystal molecules 7 having negative dielectric anisotropy, and is aligned in the direction perpendicular to the upper and lower substrates 1 and 2 (perpendicular alignment). The present invention is, however, not limited to the above-mentioned preferred embodiment. For example, the guest-host liquid crystal 4 may be aligned in the direction parallel to the substrates 1 and 2 (transverse alignment). In view of practical use, the perpendicular alignment is preferred to the transverse alignment, because the transverse alignment readily achieves a white level and a high contrast. Examples of nematic liquid crystals having negative dielectric anisotropy include fluorophenylcyclohexane compounds. Nematic liquid crystals comprising the fluorophenylcyclohexane compounds have an excellent γ-characteristic. The guest-host liquid crystal display device in this embodiment is of a reflecting type. One substrate 1 is transparent and lies on the side of the incident light, and the other substrate 2 lies on the reflection side and is provided with a reflective layer and a quarter-wavelength layer 8 in that order from the bottom. The reflective layer functions as a reflective electrode 6 in this embodiment.

The reflective-type guest-host liquid crystal display device in accordance with the present invention does not require a polarizing plate, since it includes the quarter-wavelength layer 8 and the reflective layer (reflective electrode) 6. Each nematic liquid crystal molecule 7 is aligned in the vertical direction at the off-state (no voltage is applied) for white displaying, as shown in FIG. 1A, and each dichroic dye 3 is also aligned in the vertical direction. As a result, a low absorbance or high reflectance of light in the liquid crystal layer is achieved. In contrast, at the on-state (a voltage is applied) for black displaying, each dichroic dye 3 is aligned in the horizontal direction accompanied by the horizontal alignment of each nematic liquid crystal molecule 7, resulting in a high absorbance or low reflectance of light. The quarter-wavelength plate 8 enhances such a change in the absorbance. Accordingly, the reflective-type guest-host liquid crystal display device can display a monochrome (black-white) image. The reflective-type guest-host liquid crystal display device can display a full color image by providing a micro color-filter.

Figure 2A:
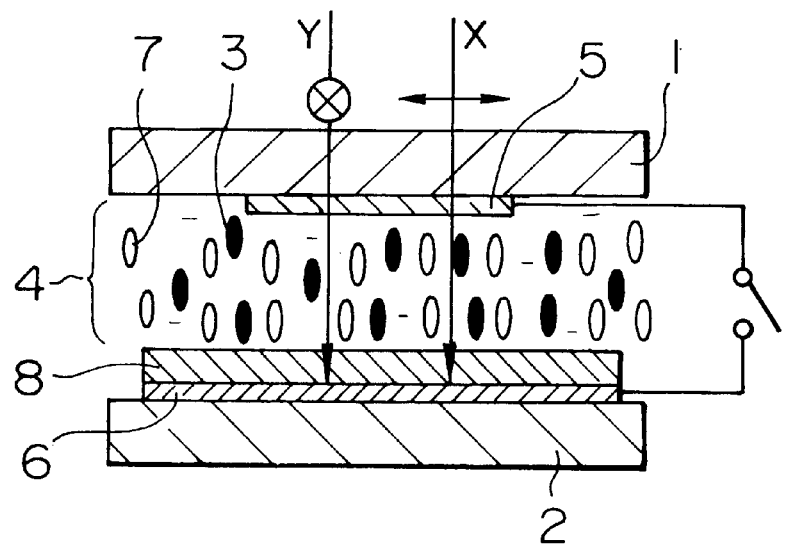
FIGS. 2A and 2B represent a schematic cross-sectional view illustrating the operation of a guest-host liquid crystal display device in accordance with the present invention.
Figure 2B:
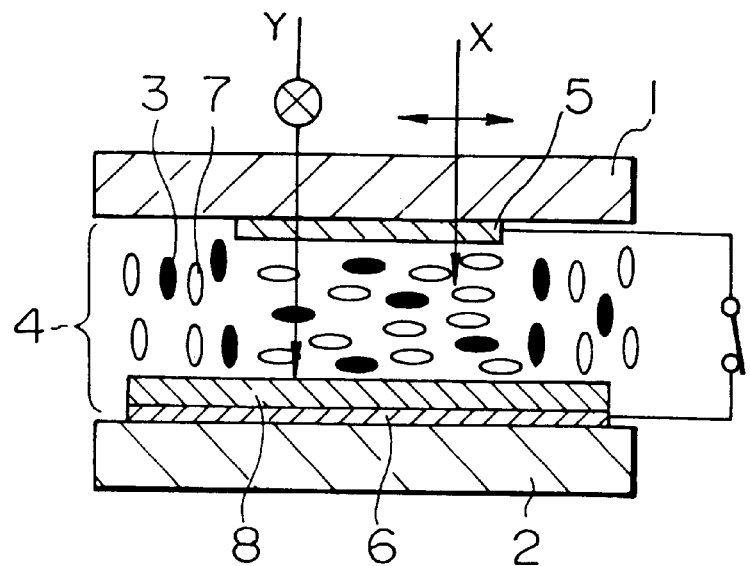

Operation of the guest-host liquid crystal display device shown in FIGS. 1A and 1B will be now described with reference to FIGS. 2A and 2B. FIG. 2A shows the off-state in which no voltage is applied. The display device transmits incident light, and thus has a white color. FIG. 2B shows the on-state in which a voltage is applied. Since the display device absorbs the incident light, it has a black color. At the off-state shown in FIG. 2A, the incident light is composed of a first vibrating component X and a second vibrating component Y which is perpendicular to the first vibrating component X. That is, the first vibrating component X is plane-polarized in the direction parallel to the plane of the figure, whereas the second vibrating component Y is plane-polarized in the direction perpendicular to the plane of the figure. When no voltage is applied, the nematic liquid crystal molecules 7 are aligned in the vertical direction and the dichroic dye 3 is also aligned. Both the first and second vibrating components X and Y entirely pass through the guest-host liquid crystal 4. In the reflected light beam, the polarization directions of the first and second vibrating components X and Y are exchanged each other, without light modulation. On the other hand, at the on-state as shown in FIG. 2B, the nematic liquid crystal molecules 7 having a negative dielectric anisotropy are altered from the vertical alignment to the horizontal alignment. Also, the dichroic dye 3 is simultaneously altered from the vertical alignment to the horizontal alignment. Since the vector of the first vibrating component X is parallel to the horizontal alignment of the liquid crystal molecules 7, the first vibrating component X is absorbed in the black dichroic dye 3 which is aligned in the same direction. On the other hand, the second vibrating component Y is not absorbed, since the vector of the second vibrating component Y is perpendicular to the horizontal alignment of the liquid crystal molecules 7. The second vibrating component Y therefore passes through the guest-host liquid crystal 4 and is incident on the quarter-wavelength layer 8. The second vibrating component Y is reflected by the reflective electrode 6 and passes through the quarter-wavelength layer 8 again. The polarization direction of the second vibrating component Y rotates by 90° after passing through the quarter-wavelength layer 8 twice. The vector of the second vibrating component Y is therefore parallel to the horizontal alignment of the dichroic dye 3, hence the reflected component is absorbed in the liquid crystal layer. Since all the components in the incident light are absorbed in the forward and reverse paths, the transmittance-type guest-host liquid crystal display device can achieve a high contrast without providing a polarizing plate.

FIG. 3 includes some examples of bis-azo dichroic dyes, each having a thienothiazole ring, represented by the chemical formula (1). FIG. 3 shows the wavelength $\lambda_{max}$ (nm) at which maximum absorption occurs and the dichroic ratio, as well as the chemical formula, of each dichroic dye. For determining the wavelength $\lambda_{max}$ (nm) and the dichroic ratio, each dichroic dye was dissolved into a liquid crystal E-7 made by DBH Co., Ltd. in an amount of 1.0 percent by weight of the liquid crystal, and the mixture was held into a 10-μm space provided between two substrates whose surfaces have been horizontally aligned. The results shown in FIG. 3 demonstrate that the bis-azo dichroic dye having a thienothiazole ring has a maximum absorption in a region in which the human eye is highly sensitive, and has a higher dichroic ratio than that of any conventional dye. If groups which are similar to the groups in a bis-azo dichroic dye are introduced to $R_2$, $R_3$, and $R_4$ of the tris-azo dichroic dye having a benzothiazole ring represented by the chemical formula (2), the tris-azo dichroic dye also has a maximum absorption in a long wavelength region, and has a high dichroic ratio.

FIG. 4 includes a referential example of a dichroic dye mixture having a black color, which is composed of a yellow dye A, an orange dye B, a red dye C, and a blue dye D in a ratio by weight of 4:4:7:20.

Figure 5:
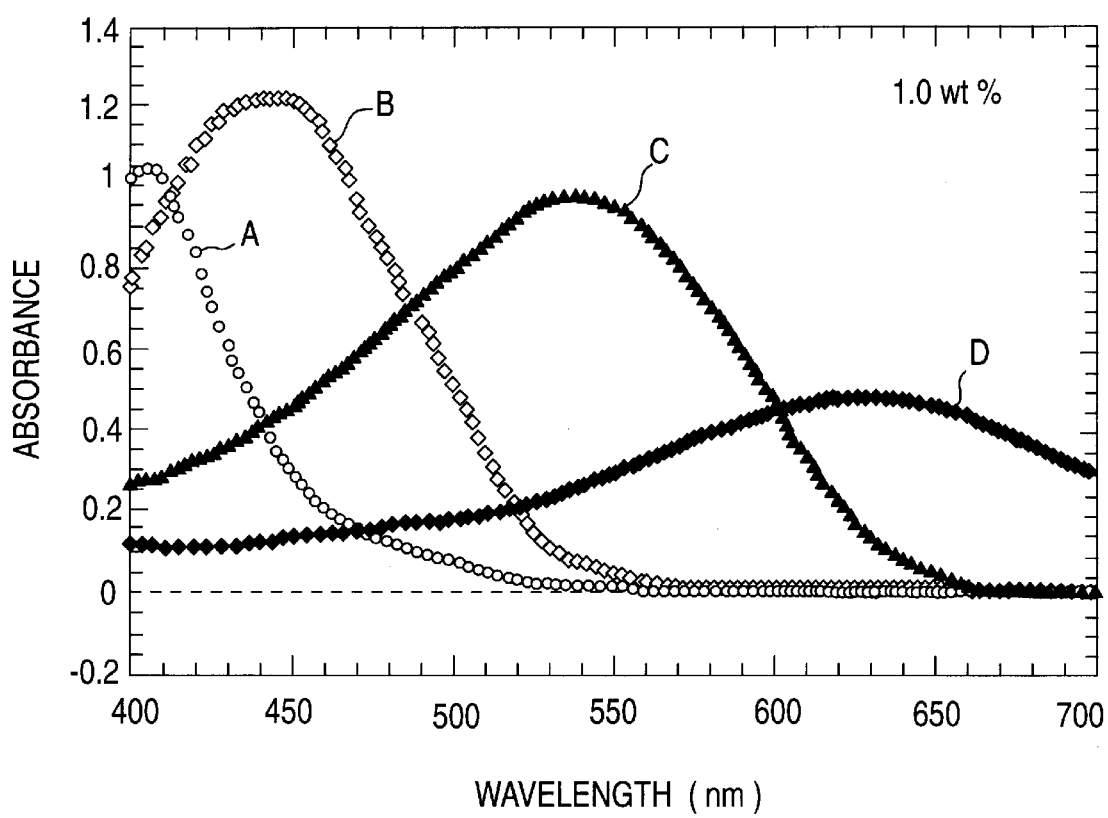
FIG. 5 is a graph of absorption spectra of the dichroic dyes shown in FIG. 4.

FIG. 5 is a graph of absorption spectra of the dyes A, B, C and D. These spectra were observed as follows: A guest-host liquid crystal composed of a nematic liquid crystal having a positive dielectric anisotropy (ZLI-1840, made by Merck & Co., Inc.) and dyes A to D, each being compounded by 1 percent by weight, was injected into a horizontally aligned cell with a 5 µm gap. The cell was rotated while observing the absorption spectrum with a polarization microscope provided with a polarizer, and was fixed at a position showing the maximum absorption. The absorption spectra shown in FIG. 5 were measured at the position, and represent the absorbance AX when the alignment direction of the liquid crystal is parallel to the polarization axis. When the cell rotates by 90 degrees, the minimum absorbance AZ is observed. The dichroic ratio is defined as AX/AZ. The graph in FIG. 5 demonstrates that the yellow dye A, each of the orange dyes C, and the red dye C have a relatively high absorbance, whereas the absorbance of the blue dye D is about half that of the other dyes. The black dichroic dye mixture therefore contains a large amount of blue dye D. If the blue dye D has a larger absorption coefficient, the amount of blue dye D to be added is reduced, and thus the total amount of the dyes A to D will be reduced. These dyes A to D have relatively high compatibility with the liquid crystal. A GH liquid crystal I as a Comparative Example was prepared by dissolving 3 percent by weight of a black dye mixture containing the dyes shown in FIG. 4 into a nematic liquid crystal with a negative dielectric anisotropy. After the GH liquid crystal I was allowed to stand at a low temperature, −30 ° C., for 1,000 hours, no crystal precipitation was observed.

FIG. 6 shows a typical example of a dichroic dye mixture showing a black color in accordance with the present invention. The dichroic dye mixture is composed of an orange dye E, a red dye F, a bluish purple dye G, and a blue dye H in a weight ratio of 2:1:4:1. The blue dye H belongs to a bis-azo compound and the bluish purple dye G belongs to a tris-azo compound in accordance with the present invention. Among many bluish purple dyes and blue dyes, these dyes G and H have high dichroic ratios and absorption coefficients.

Figure 7:
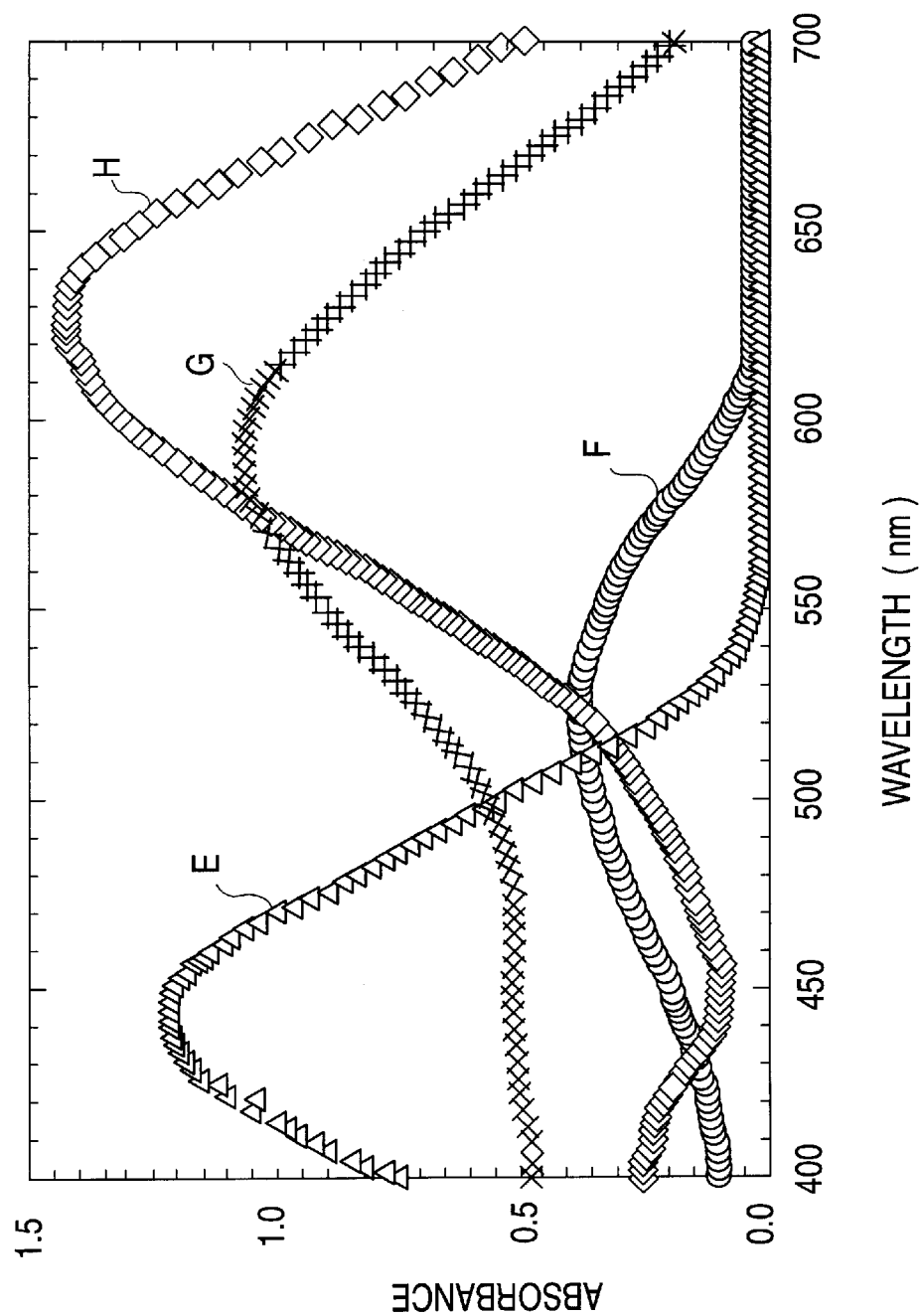
FIG. 7 is a graph of absorption spectra of the dichroic dyes shown in FIG. 6.

FIG. 7 is a graph of absorption spectra of the dyes shown in FIG. 6. The graph clearly illustrates that the bluish purple dye G and the blue dye H have large absorbances at a long wavelength region in which the human eye is highly sensitive. The black dichroic dye mixture in an amount of 2 percent by weight was dissolved into a liquid crystal with a negative dielectric anisotropy to prepare a GH liquid crystal II. Table 1 includes the wavelength $\lambda_{max}$ at which maximum absorption occurs, the dichroic ratio, and the absorbance AX of the dyes D, G and H.

TABLE 1

|  | Dye D | Dye G | Dye H |
| --- | --- | --- | --- |
| $\lambda_{max}$ | 620–630 | 590 | 620–630 |
| Dichroic ratio | 11 | 12 | 13 |
| Absorbance AX (in 5 µm cell) | 0.47 | 1.0 | 1.3 |

Figure 8:
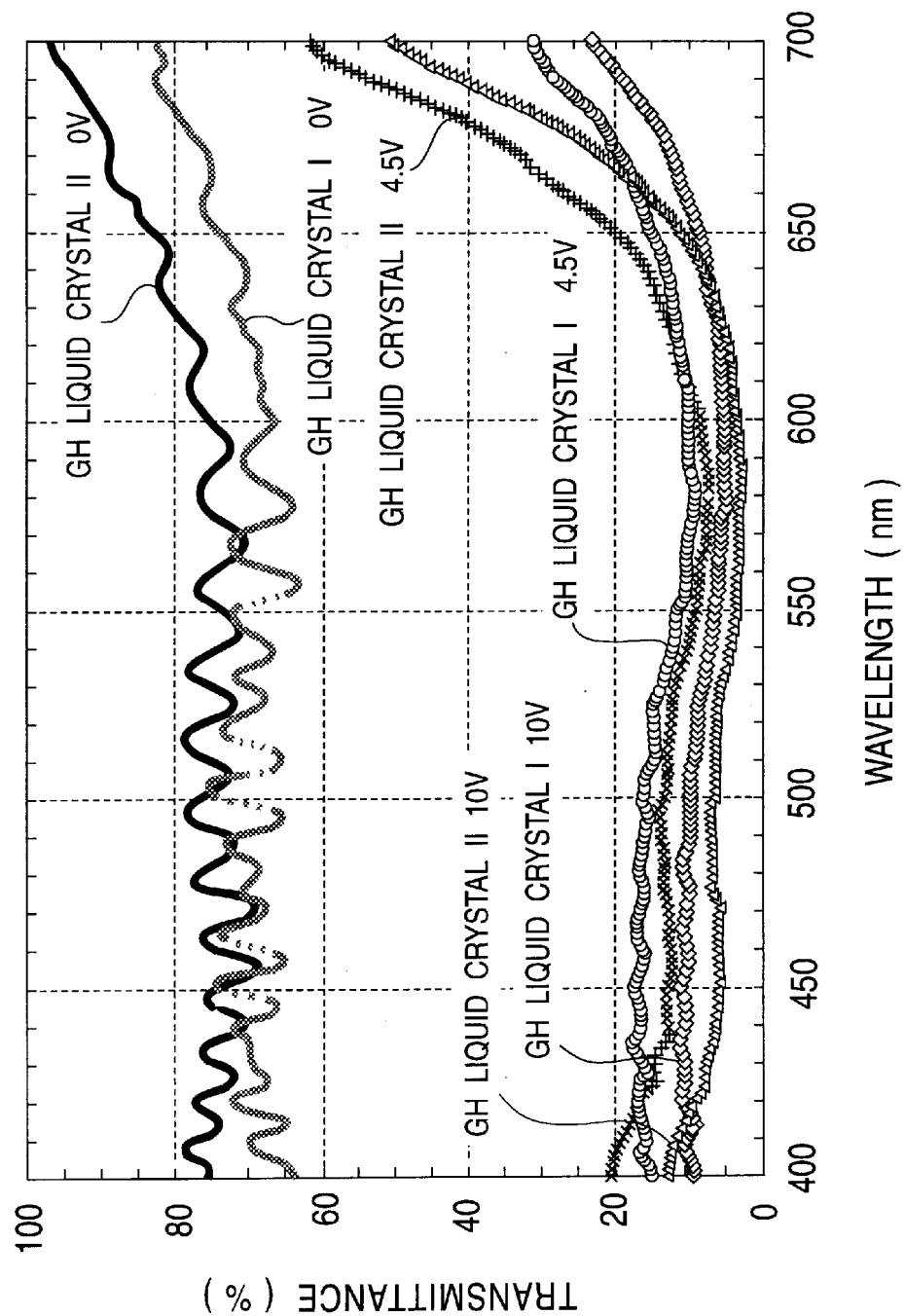
FIG. 8 is a graph of light transmittance of some guest-host liquid crystals.

FIG. 8 is a graph of light transmittance of the GH liquid crystal I and the GH liquid crystal II in the vertically aligned test cell when a voltage is applied. The test cell has a gap of 0.5 µm. As described above, the GH liquid crystal I is composed of 3 percent by weight of the black dye mixture, shown in FIG. 4, dissolved in the nematic liquid crystal having negative dielectric anisotropy, and the GH liquid crystal II is composed of 2 percent by weight of the black dye mixture, shown in FIG. 6, dissolved in the nematic liquid crystal having negative dielectric anisotropy. Since the bluish dyes in the GH liquid crystal II have higher absorption coefficients than that of the GH liquid crystal I, the amount of the black dye mixture can be reduced in the GH liquid crystal II compared with the GH liquid crystal I. FIG. 8 demonstrates that the transmittance of the GH liquid crystal II is higher than that of the GH liquid crystal I at a white level when no voltage is applied, and thus has a clearer white color. Further, when a 4.5-V or 10-V voltage is applied, the transmittance of the GH liquid crystal II in a wavelength range from 450 to 650 nm is lower than that of the GH liquid crystal I, and thus has a clearer black color. Although the correlation of the transmittance is reversed in wavelength ranges from 650 to 700 nm and from 400 to 450 nm, the human eye is not so sensitive in these ranges. The comparison of the transmittance in the wavelength range from 450 to 650 nm is therefore reasonable in view of practical use. Consequently, the GH liquid crystal II has superior black and white levels compared with the GH liquid crystal I, regardless of its low dye content.

Figure 9:
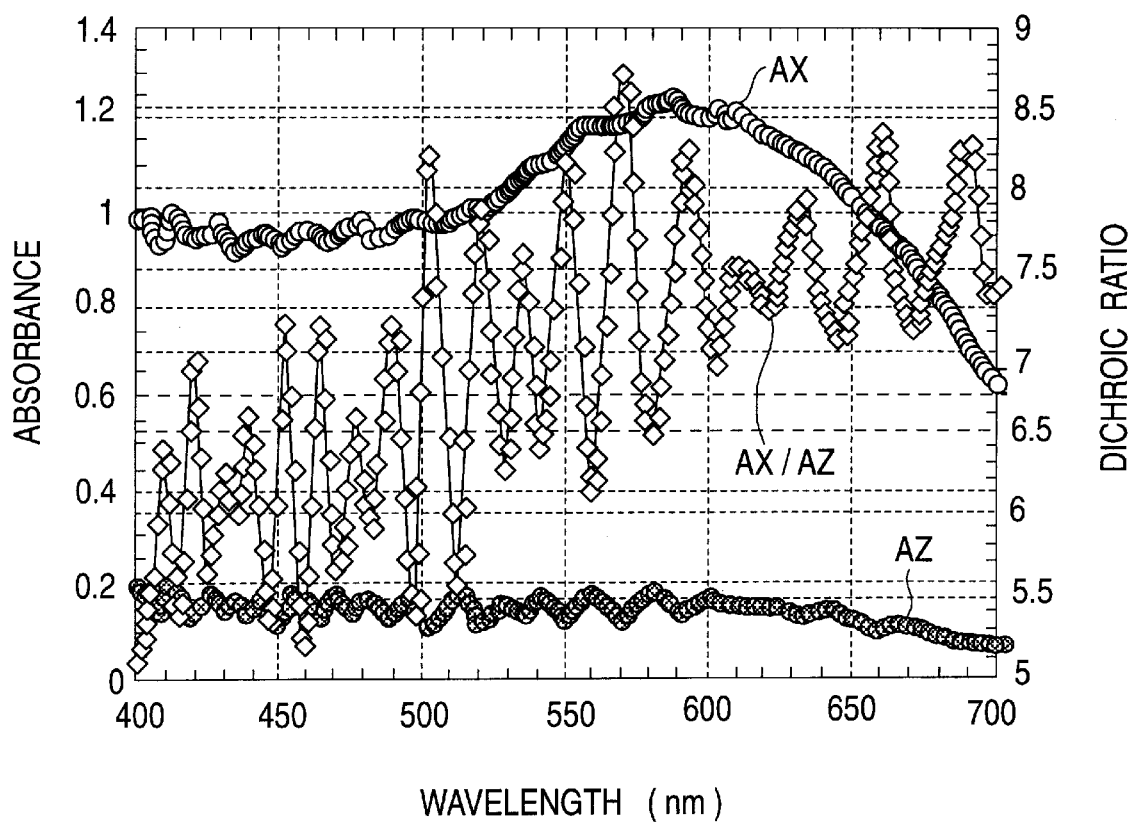
FIG. 9 is a graph of a dichroic ratio of a guest-host liquid crystal display device using the dichroic dyes shown in FIG. 4.
Figure 10:
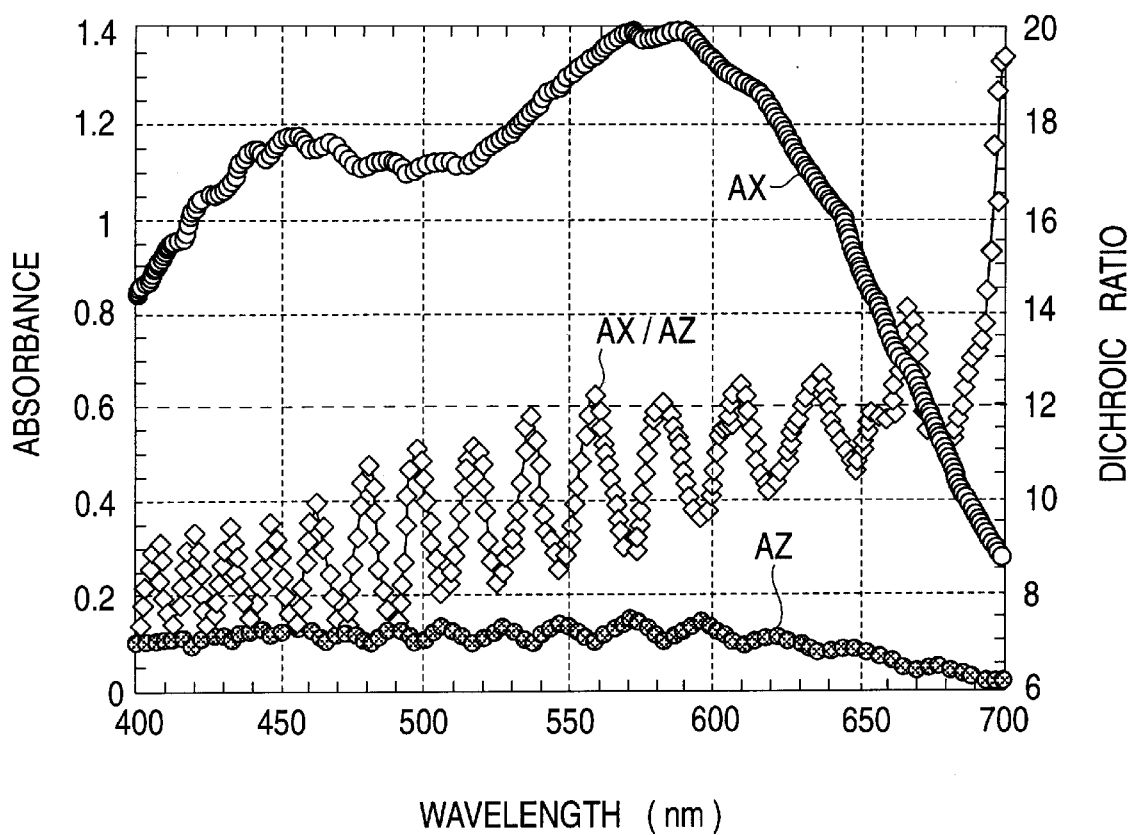
FIG. 10 is a graph of a dichroic ratio of a guest-host liquid crystal display device using the dichroic dyes shown in FIG. 6.

FIG. 9 is a graph of the dichroic ratio of the GH liquid crystal I in the vertically aligned cell, and FIG. 10 is a graph of the dichroic ratio of the GH liquid crystal II in the same cell. When no voltage is applied, the absorbance AZ of each GH liquid crystal is low because of the vertical alignment. When a 10-V voltage is applied, the liquid crystal is rearranged to the parallel alignment and has an absorbance AX. The graph demonstrates that the dichroic ratio AX/AZ in a high-absorbance range of 550 to 600 nm is approximately 8.5 for the GH liquid crystal I, or 10 to 12 for the GH liquid crystal II. The GH liquid crystal II containing small amounts of the tris-azo and bis-azo compounds having a benzothiazole ring and a thienothiazole ring, respectively, has a high dichroic ratio and a large absorption coefficient, and thus can display satisfactory black and white levels. Further, these dyes have high compatibility with the liquid crystal, and crystal precipitation was not observed after the GH liquid crystal was allowed to stand at −30° C. for 1,000 hours.

Figure 11:
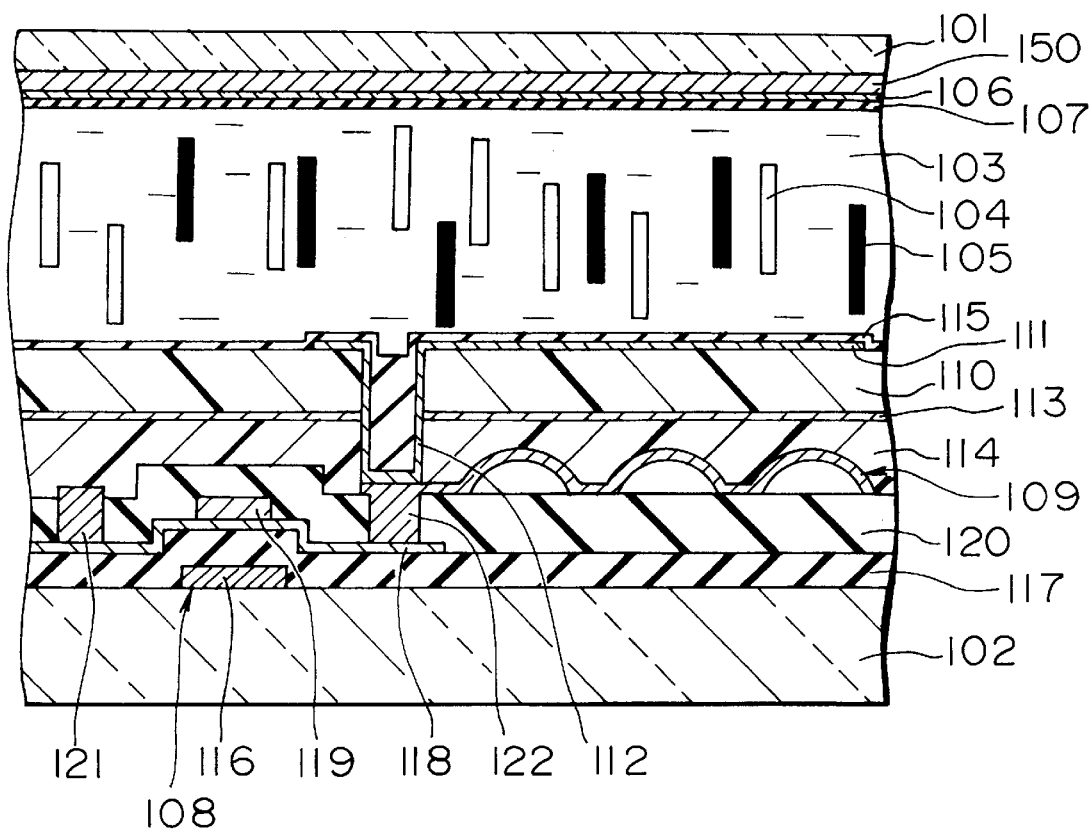
FIG. 11 is a partial schematic cross-sectional view of a guest-host liquid crystal display device in accordance with the present invention.

A preferred configuration of the guest-host liquid crystal display device in accordance with the present invention will now be described with reference to FIG. 11. The guest-host liquid crystal display device is a reflective type, and is provided with an active matrix micro color filter to achieve full color displaying. The guest-host liquid crystal display device is provided with a pair of substrates, i.e., an upper substrate 101 and a lower substrate 102, which oppose each other with a given space, for example, 5 µm therebetween. The upper substrate 101 lies on the side of the incident light, and is composed of a transparent material such as glass. The lower substrate 102 lies on the reflection side, and may be composed of a transparent or nontransparent material. A guest-host liquid crystal 103 is held in the space between the upper and lower substrate 101 and 102. The guest-host liquid crystal 103 comprises nematic liquid crystal molecules 104 having negative dielectric anisotropy and contains a given amount of a dichroic dye mixture 105 having a black color which is prepared in accordance with the present invention. The upper substrate 101 is provided with a micro color filter 150, a counter electrode 105 and an alignment layer 107 on its inner face. The counter electrode 106 is composed of a transparent conductive film such as an ITO film. The alignment layer 107 is composed of, for example, a polyimide film, on which the guest-host liquid crystal 103 is vertically aligned. Alternatively, the guest-host liquid crystal may be horizontally aligned in the present invention. In this embodiment, the guest-host liquid crystal 103 is vertically aligned when no voltage is applied, or is horizontally aligned when a voltage is applied. The lower substrate 102 is provided with a switching element composed of a thin film transistor 108, a reflecting layer 109, a quarter-wavelength layer 110, and a pixel electrode 111. In a typical configuration, the pixel electrode 111 is patterned on the thin film transistor 108 and a reflective layer 109, hence a sufficiently high voltage can be applied to the guest-host liquid crystal 103 through the pixel electrode 111 and the counter electrode 106. The pixel electrode 111 is electrically connected to the thin film transistor 108 through a contact hole 112 provided in the quarter-wavelength layer 110.

Each unit will now be described in more detail. In this embodiment, the quarter-wavelength layer 110 is composed of a uniaxially-oriented polymeric liquid crystal film. The quarter-wavelength layer 110 is provided with an underlying orientation layer 113 for uniaxially orientating the polymeric liquid crystal film. A planarization layer 114 is provided under the underlying orientation layer 113 so as to embed the unevenness on the thin film transistor 108 and the reflecting layer 109. The quarter-wavelength layer 110 is deposited above the planarization layer 114. The pixel electrode 111 is connected to the thin film transistor 108 through a contact hole 112 piercing through the quarter-wavelength layer 110 and the planarization layer 114. The reflecting layer 109 is provided so as to correspond to the pixel electrode 111. The reflecting layer 109 and the pixel electrode 111 has the same voltage. No undesirable electric field is therefore applied to the quarter-wavelength layer 110 and the planarization layer 114 intervened between the reflecting layer 109 and the pixel electrode 111.

The reflecting layer 109 is provided with a reflecting pattern which scatteringly reflects the incident light and thus improves the image quality because of effectively preventing mirror reflection. An alignment layer 115 is formed so as to cover the surface of the pixel electrode, and comes into contact with the guest-host liquid crystal 103 to control the alignment of the liquid crystal. The alignment layer 115 helps the vertical alignment of the guest-host liquid crystal 103 in cooperation with the alignment layer 107. The thin film transistor 108 has a bottom gate structure, and is provided with a gate electrode 116, a gate insulating film 117, and a semiconductor thin film 118 which are deposited from the bottom in that order. The semiconductor thin film 118 is composed of, for example, polycrystalline silicon, and the upper face of a channel region which is self-aligned to the gate electrode 116 is protected with a stopper 119. The bottom-gate thin film transistor 108 is covered with an insulating interlayer 120. The insulating interlayer 120 is provided with a pair of contact holes for electrically connecting a source electrode 121 and a drain electrode 122 to the thin film transistor 108. The source and drain electrodes 121 and 122 are formed by patterning aluminum. The drain electrode 122 and the reflecting layer 109 have the same voltage. The pixel electrode 111 is electrically connected to the drain electrode 122 through the contact hole 112. On the other hand, signal voltages such as video signals are supplied to the source electrode 121. A plurality of micro color filters 150 corresponding to pixels are provided on the counter electrode 106. The reflective-type guest-host liquid crystal display device having such a configuration can display a high-quality full-color moving image with a high contrast in response to input video signals.

The dichroic dyes will now be described in more detail to promote further comprehension of the present invention. A guest-host liquid crystal composition is composed of a liquid crystal as a host and dichroic dyes as guests dissolved therein. The use of such a guest-host liquid crystal composition enables a display based on two states, that is, a colored state and a non-colored state. A liquid crystal display system using such a phenomenon is referred to as a guest-host system. Dichroic dyes used in guest-host liquid crystal displays have several requirements, that is, high orientational order in host liquid crystals for achieving a high contrast between the colored and non-colored states; various hues in response to the use; stability to light, heat, and moisture and oxygen in air; high solubility in host liquid crystals; and high retainability of the voltage. An additional requirement is a reduced increase in viscosity when adding the dichroic dyes. The response times of the liquid crystal when a voltage is applied to a liquid crystal display device and when the application of the voltage is stopped, respectively, are represented by the following approximate equations:

$$T_{on} = \frac{\eta d^2}{\Delta \varepsilon V^2 - K\pi^2}$$

$$T_{off} = \frac{\eta d^2}{K\pi^2}$$

wherein $T_{on}$ represents the response time when a voltage is applied, $T_{off}$ represents the response time when the voltage application is stopped, $\eta$ represents the viscosity of the liquid crystal, K represents the elastic constant, $\Delta\varepsilon$ represents the change in the dielectric constant, i.e., the dielectric anisotropy of the liquid crystal, d represents the thickness of the liquid crystal, and V represents an applied voltage. As shown in the above equations, these response times of the liquid crystal display device are proportional to the viscosity of the liquid crystal composition; thus an increased viscosity causes a decrease in the response time. Consequently, achievement of a display with a short response time for moving images requires a liquid crystal composition with a low viscosity. For achieving the low viscosity of the liquid crystal composition, an increase in viscosity due to guest dichroic dyes must be suppressed as much as possible, to say nothing of the use of a host liquid crystal having a low viscosity. Preferred dichroic dyes therefore have a large absorption coefficient and high solubility in liquid crystals.

In the long-wavelength region of more than 630 nm, very few dyes having high dichroic ratios of 10 or more are known. Anthraquinone dyes have been used as dyes having absorbance in the long-wavelength region. Since no known dichroic dyes including the anthraquinone dyes have large absorption coefficients, large quantities of dyes must be added to achieve a clear color tone and high contrast. As described above, the increased dye contents causes an increased viscosity of the liquid crystal and precipitation of the dichroic dyes at low temperature, hence the range of the content for practical use is limited. Further, the anthraquinone dyes have low solubility, hence a sufficient image density is barely obtained. As a result, the black display is reddish or has a low contrast.

In contrast, the liquid crystal composition in accordance with the present invention has the following advantages. A sufficiently high contrast is achieved in the long-wavelength region even when small quantities of dyes are added because of their large absorption coefficients. The increased viscosity of the liquid crystal composition is suppressed. Further, the liquid crystal display devices using the liquid crystal composition is capable of displaying moving images as a result of quick on-off responses. The guest-host liquid crystal composition having such advantages is achieved by a mixture, as a guest, of specified dichroic dyes having particular molecular structures, that is, a bis-azo dichroic dye having a thienothiazole ring and a tris-azo dichroic dye having a benzothiazole ring. The bis-azo dichroic dye having a thienothiazole ring is represented by the following chemical formula (1):

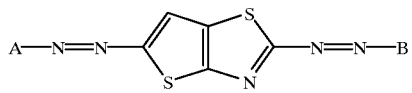
(1)

wherein A is

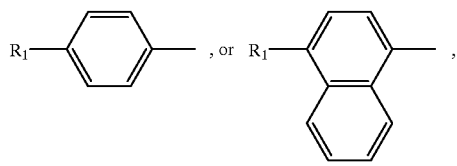

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; and B is

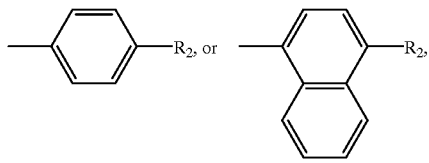

wherein $R_2$ is

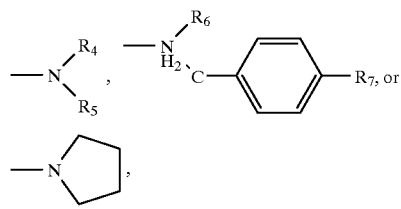

wherein each of $R_4$ and $R_5$ is independently a hydrogen atom, or $C_nH_{2n+1}$, and $R_6$ is a methyl group, and $R_7$ is $C_mH_{2m+1}$, or $OC_mH_{2m+1}$, wherein n is an integer from 1 to 5 and m is an integer from 1 to 8.

A bis-azo dye with such a thienothiazole ring has a high dichroic ratio, a large absorption coefficient, and high solubility in nematic liquid crystals, hence a small amount of the bis-azo dye causes a high contrast without a noticeable increase in the viscosity. Each of A and B in the chemical formula represents a substituted or unsubstituted benzene or naphthalene ring, and at least one of A and B is a substituted or unsubstituted naphthalene ring. A method for making such a dichroic dye is disclosed in, for example, Japanese Laid-Open Patent No. 1-1469605. The bis-azo dichroic dye with a thienothiazole ring having a large absorption coefficient is added to the liquid crystal, preferably in an amount of 0.05 wt % to 5.0 wt %. In the displaying of color in guest-host liquid crystal display devices, dichroic dyes perform black-white switching based on the difference in the absorbance between the on- and off-states, and color filters perform the displaying of color. The guest-host liquid crystal composition is therefore used for displaying a black color. The black color is formed by a mixture of at least four dyes having different colors. At least 0.05 percent by weight of the mixture must be added to the liquid crystal for forming a clear black, whereas a mixture content of higher than 5 percent by weight causes precipitation of the dye crystals and an increased viscosity. It is more preferable that the concentration be in a range from 0.2 to 4.0 percent by weight.

Liquid crystals preferably used in the present invention have nematic phases at room temperature. Among nematic liquid crystals, those having positive dielectric anisotropy are referred to as Np liquid crystals, and those having negative dielectric anisotropy are referred to as Nn liquid crystals. In the present invention, no great differences in liquid crystal characteristics are observed between the Np liquid crystals and the Nn liquid crystals. Some Nn liquid crystals, and particularly fluorophenylcyclohexane Nn liquid crystals have excellent γ-characteristics. Such fluorophenylcyclohexane Nn liquid crystals are disclosed in, for example, Japanese Laid-Open Patent No. 60-199840, and can be used in the present invention. FIG. 12 includes some liquid crystals having dielectric anisotropy Δε in a range from −2 to −10 for reference. Most of these liquid crystals are fluorine-containing nematic liquid crystals having dielectric anisotropy Δε in a range from −2 to −10. Changes in the NI point and voltage retainability, however, are observed in the fluorine-containing nematic liquid crystals, although these characteristics are important in liquid crystals. In the present invention, therefore, a liquid crystal composition having desirable characteristics is prepared by mixing some of these liquid crystals A to W in adequate amounts. For example, a mixture of liquid crystals B, H, M, O, P, S, and T with an adequate formulation can provide a liquid crystal composition having a relatively high NI point, and excellent voltage retainability.

Figure 13:
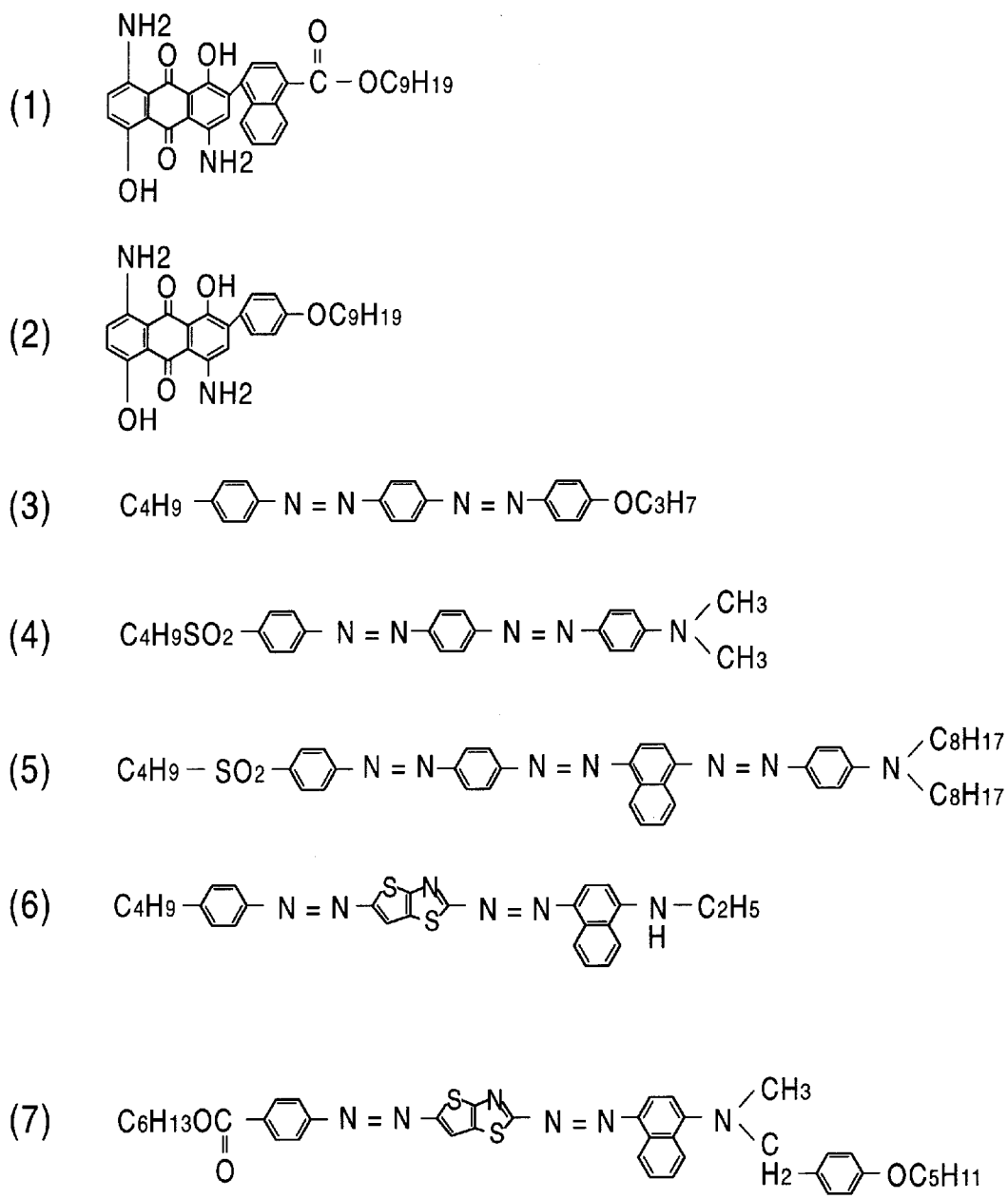
FIG. 13 shows chemical formulae of various dichroic dyes.

FIG. 13 shows typical examples of dichroic dyes having various structures. Dyes (1) to (5) are shown for comparison, and Dyes (6) and (7) are shown as examples in accordance with the present invention. Both Dyes (6) and (7) belong to bis-azo dichroic dyes having thienothiazole rings as chromophoric groups. Dyes (1) and (2) belong to anthraquinone dichroic dyes, and Dyes (3) to (5) belong to general bis-azo dyes.

Figure 14:
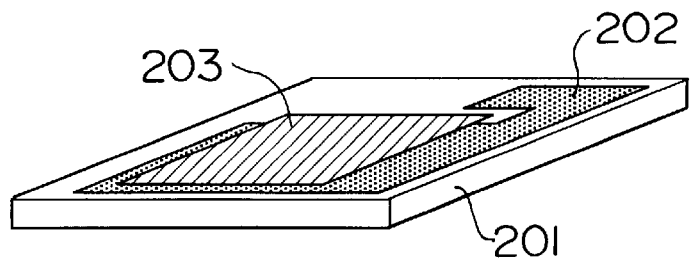
FIG. 14 is an isometric view of a substrate for a test cell.
Figure 15:
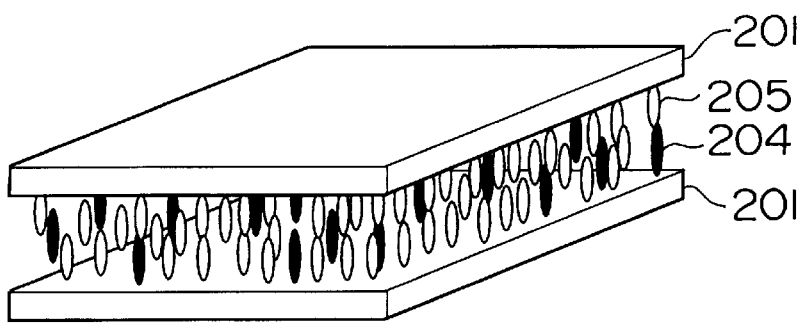
FIG. 15 is a schematic isometric view of a test cell.
Figure 16:
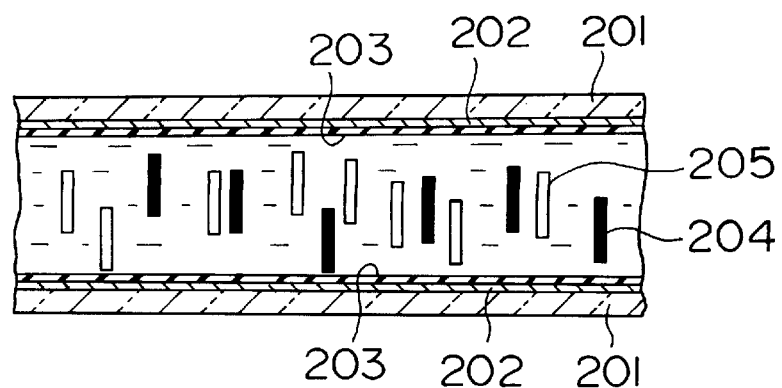
FIG. 16 is a schematic partial cross-sectional view of a test cell.

Seven guest-host liquid crystal compositions were prepared using these Dyes (1) to (7) and injected into test liquid crystal cells to determine the absorption coefficients, dichroic ratios and response times. Configurations of a substrate used for the test cell are shown in FIGS. 14 to 16. An electrode 202 of ITO, etc., is formed by patterning on a glass substrate 201, and is covered with an alignment film of polyimide or the like. A pair of glass substrates 201 oppose each other with a given space to provide a test cell. A dichroic dye mixture dissolved in a host liquid crystal 205 is held in the test cell. FIG. 16 is a schematic cross-sectional view of the test cell prepared in such a manner.

The absorption coefficient and dichroic ratio of each guest-host liquid crystal composition are shown in Table 2, wherein the absorption coefficient is calculated by the equation AX=αcd, wherein AX represents the absorbance, c represents the concentration (percent by weight) of the dye, and d represents the thickness (nm) of the liquid crystal layer. The dichroic ratio AX/AZ was calculated from AX and AZ which were determined using a vertically-aligned cell. Table 3 shows $T_{on}$ and $T_{off}$ of these compositions.

TABLE 2

| Type | Dye | Absorption Coefficient | Dichroic Ratio |
|---|---|---|---|
| Anthraquinone | (1) | 0.018 | 6 |
| | (2) | 0.059 | 6 |
| Bis-azo | (3) | 0.202 | 10 |
| | (4) | 0.220 | 9 |
| | (5) | 0.156 | 8 |
| Bis-azo with thienothiazole ring | (6) | 0.259 | 13 |
| | (7) | 0.251 | 12 |

TABLE 3

| Type | Dye | $T_{on}$ | $T_{off}$ |
|---|---|---|---|
| Anthraquinone | (1) | 29.5 | 36.1 |
| | (2) | 28.9 | 37.9 |
| Bis-azo | (3) | 28.2 | 32.2 |
| | (4) | 26.5 | 31.6 |
| | (5) | 25.8 | 30.8 |
| Bis-azo with thienothiazole ring | (6) | 23.7 | 21.4 |
| | (7) | 25.4 | 33.4 |

As Comparative Example 1, a liquid crystal composition was prepared by dissolving the known anthraquinone dichroic Dye (1) in FIG. 13 into a nematic liquid crystal available from Merck & Co., Inc., and was held in the liquid crystal cell as shown in FIGS. 15 and 16 to determine the absorption coefficient, the dichroic ratio and the response times. The nematic liquid crystal was an Nn fluorine-containing liquid crystal. The dye content was 1 percent by weight, and the dye was dissolved by heat with stirring. As shown in Tables 2 and 3, although the response times are not significantly large, they are clearly larger than those of the Examples in accordance with the present invention. The Nn liquid crystal shows a relatively low absorption coefficient and dichroic ratio.

A liquid crystal composition of Comparative Example 2 was prepared by dissolving the known dichroic Dye (2) into the same host liquid crystal which was used in Comparative Example 1, and the absorbance and the response time were measured as in Comparative Example 1. The response time was larger than that in Examples in accordance with the present invention. Further, the absorbance and the dichroic ratio were smaller than those in the Examples in accordance with the present invention.

A liquid crystal composition of Comparative Example 3 was prepared by dissolving the known dichroic Dye (3) into the same host liquid crystal which was used in Comparative Example 1, and the absorbance and the response time were measured as in Comparative Example 1. The response time was larger than that in Examples in accordance with the present invention, although it lies within a practical level. Further, the absorbance and the dichroic ratio were smaller than those in the Examples in accordance with the present invention, although they were improved compared with those in other Comparative Examples.

A liquid crystal composition of Comparative Example 4 was prepared by dissolving the known dichroic Dye (4) into the same host liquid crystal which was used in Comparative Example 1, and the absorbance and the response time were measured as in Comparative Example 1. The response time was larger than that in Examples in accordance with the present invention, although it lies within a practical level. Further, the absorbance and the dichroic ratio were smaller than those in the Examples in accordance with the present invention, although they were improved compared with those in other Comparative Examples.

A liquid crystal composition of Comparative Example 5 was prepared by dissolving the known dichroic Dye (5) into the same host liquid crystal which was used in Comparative Example 1, and the absorbance and the response time were measured as in Comparative Example 1. The response time was larger than that in Examples in accordance with the present invention, although it lies within a practical level. Further, the absorbance and the dichroic ratio were smaller than those in the Examples in accordance with the present invention, although they were improved compared with those in other Comparative Examples.

A liquid crystal composition of Example 1 was prepared by dissolving the known dichroic Dye (6) into the same host liquid crystal which was used in Comparative Example 1, and the absorbance and the response time were measured as in Comparative Example 1. The liquid crystal composition had a response time which was sufficiently short to continuously display moving images. Further, the absorbance and the dichroic ratio were considerably large.

A liquid crystal composition of Example 2 was prepared by dissolving the known dichroic Dye (7) into the same host liquid crystal which was used in Comparative Example 1, and the absorbance and the response time were measured as in Comparative Example 1. The liquid crystal composition had a response time which was sufficiently short to continuously display moving images. Further, the absorbance and the dichroic ratio were considerably large.

It is preferred that the dichroic dye composition, that is, the black dye mixture, in accordance with the present invention contains a bis-azo dichroic dye with a thienothiazole ring represented by the following general formula (1), a tris-azo dichroic dye with a benzothiazole ring represented by the following general formula (2), and at least one azo dichroic dye selected from the group consisting of dyes represented by the following general formulae (3), (4) and (5):

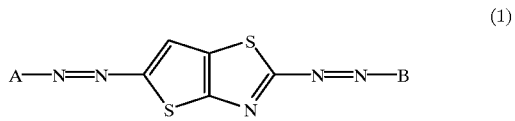

(1)

wherein A is

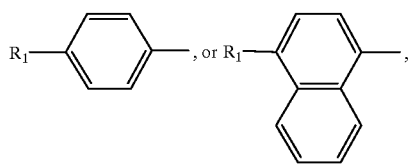

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; and B is

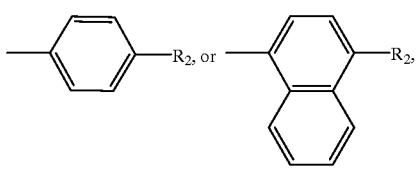

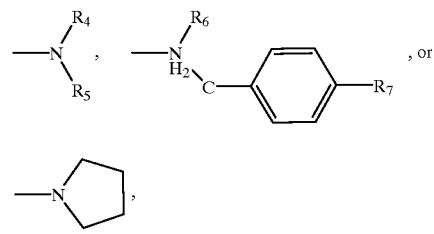

wherein $R_2$ is

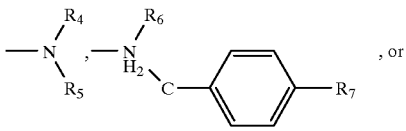

wherein each of $R_4$ and $R_5$ is independently a hydrogen atom or $C_nH_{2n+1}$; $R_6$ is a methyl group; and $R_7$ is $C_mH_{2m+1}$, or $OC_mH_{2m+1}$, wherein n is an integer from 1 to 5, and m is an integer from 1 to 8;

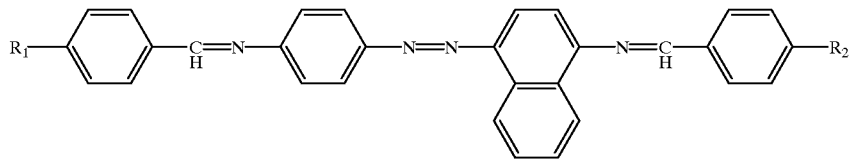 (3)

-continued

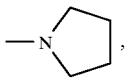

wherein each of $R_4$ and $R_5$ is independently a hydrogen atom, or $C_nH_{2n+1}$, and $R_6$ is a methyl group, and $R_7$ is $C_mH_{2m+1}$, or $OC_mH_{2m+1}$, wherein n is an integer from 1 to 5 and m is an integer from 1 to 8;

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2C_nH_{2n+1}$, wherein n is an integer from 1 to 8; and $R_2$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8;

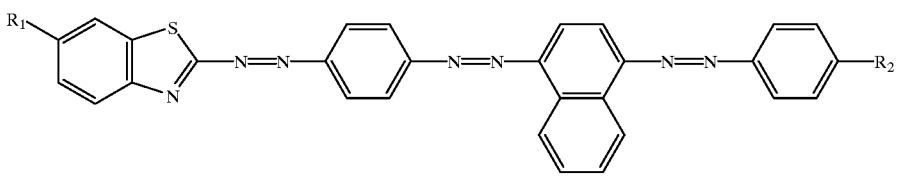 (2)

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; and $R_2$ is

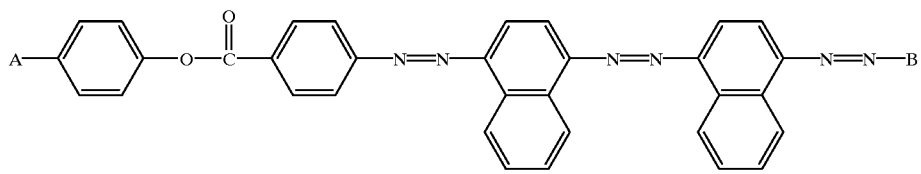

(4)

wherein A is $C_nH_{2n+1}$, or

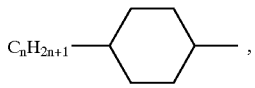

wherein n is an integer from 1 to 8; and B is

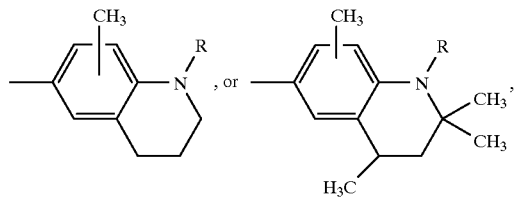

wherein R is $C_nH_{2n+1}$, or $C_nH_{2n}OCH_3$, wherein n is an integer from 1 to 8;

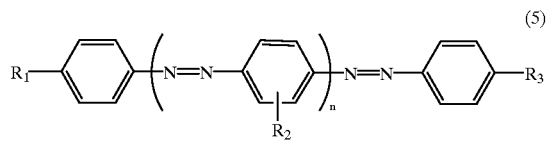

(5)

wherein R1 is $C_nH_{2n+1}$, $OC_nH_{2n+1}$, $COC_nH_{2n+1}$, $OCOC_nH_{2n+1}$, $C_6H_4C_nH_{2n+1}$, $COOC_nH_{2n+1}$, or $CH_2C_nH_{2n+1}$, wherein n is an integer from 1 to 8; $R_2$ is a hydrogen or halogen atom, a linear alkyl group having four or less carbon atoms or a lower alkoxy group; and $R_3$ is

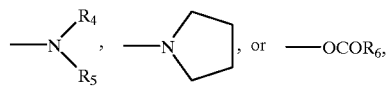

wherein each of $R_4$, $R_5$, and $R_6$ is independently a hydrogen atom or $C_nH_{2n+1}$, wherein n is an integer from 1 to 5.

Figure 17:
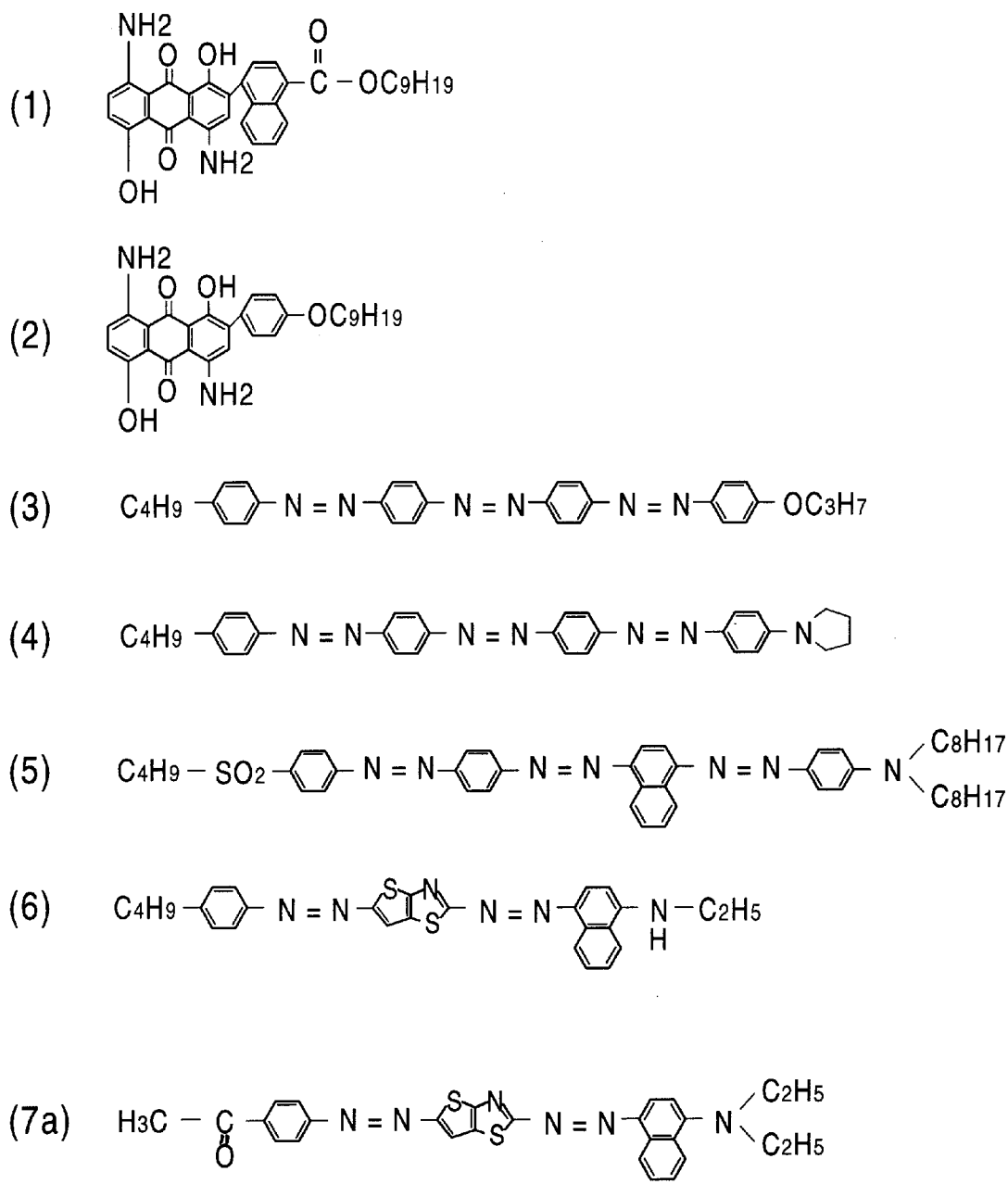
FIG. 17 shows chemical formulae of various dichroic dyes.

FIGS. 17 and 18 include typical examples of the dichroic dyes represented by any one of the general formulae (1) to (5), wherein Compounds (1) to (5) are listed for comparison and thus do not correspond to any of the general formulae (1) to (5). Compounds (6) and (7a) correspond to the general formula (1), Compounds (8) and (9) correspond to the general formula (2), Compound (10) corresponds to the general formula (3), Compound (11) corresponds to the general formula (4), and Compounds (12) to (14) correspond to the general formula (5). The Compounds (1) to (14) and their dichroic ratio are summarized in Table 4.

TABLE 4

| Dye type | Compound | Dichroic | Ratio |
|---|---|---|---|
| Anthraquinone | | (1) | 6 |
| | | (2) | 6 |
| Azo | | (3) | 10 |
| | | (4) | 9 |
| | | (5) | 8 |
| General formula (1) | | (6) | 13 |
| | | (7a) | 12 |
| General formula (2) | | (8) | 11 |
| | | (9) | 11 |
| General formula (3) | | (10) | 12 |
| General formula (4) | | (11) | 10.5 |
| General formula (5) | | (12) | 9 |
| | | (13) | 10 |
| | | (14) | 12 |

Using Compounds (1) to (14) shown in Table 4, liquid crystal compositions for Comparative Examples 6 to 9, and Examples 3 to 10 in accordance with the present invention were prepared as in the above-mentioned Comparative Examples 1 to 5 and Examples 1 and 2. The absorbance, and the number and types of dyes in the composition are shown in Table 5. As clearly demonstrated by the comparison of FIGS. 19 to 22 showing Comparative Examples 6 to 9 with FIGS. 23 to 30 showing Examples 3 to 10, each of the compositions of Examples 3 to 10 shows a higher absorbance than that of Comparative Examples 6 to 9 in a long wavelength region in which the human eye is highly sensitive. Accordingly, as shown in Table 5, the addition of at least one dichroic dye selected from the group consisting of dyes represented by the following general formulae (3), (4) and (5) to a mixture of dichroic dyes represented by the general formulae (1) and (2) as essential components can improve the image quality of the guest-host liquid crystal display device.

TABLE 5

| | Absorption Spectrum | Number of dyes | Types of dyes (general formula) |
|---|---|---|---|
| Comp. Ex. 6 | FIG. 19 | 5 | Other than (1) to (5) |
| Comp. Ex. 7 | FIG. 20 | 2 | (3) + (4) |
| Comp. Ex. 8 | FIG. 21 | 3 | (2) + (3) + (4) |
| Comp. Ex. 9 | FIG. 22 | 3 | (1) + (3) + (4) |
| Example 3 | FIG. 23 | 3 | (1) + (2) + (3) |
| Example 4 | FIG. 24 | 3 | (1) + (2) + (3) |
| Example 5 | FIG. 25 | 3 | (1) + (2) + (4) |
| Example 6 | FIG. 26 | 3 | (1) + (2) + (5) |
| Example 7 | FIG. 27 | 4 | (1) + (2) + (3) + (5) |
| Example 8 | FIG. 28 | 5 | (1) + (2) + (3) + (4) + (5) |
| Example 9 | FIG. 29 | 5 | (1) + (2) + (3) + (4) + (5) |
| Example 10 | FIG. 30 | 5 | (1) + (2) + (3) + (4) + (5) |

Comp. Ex.: Comparative Example

Figure 19:
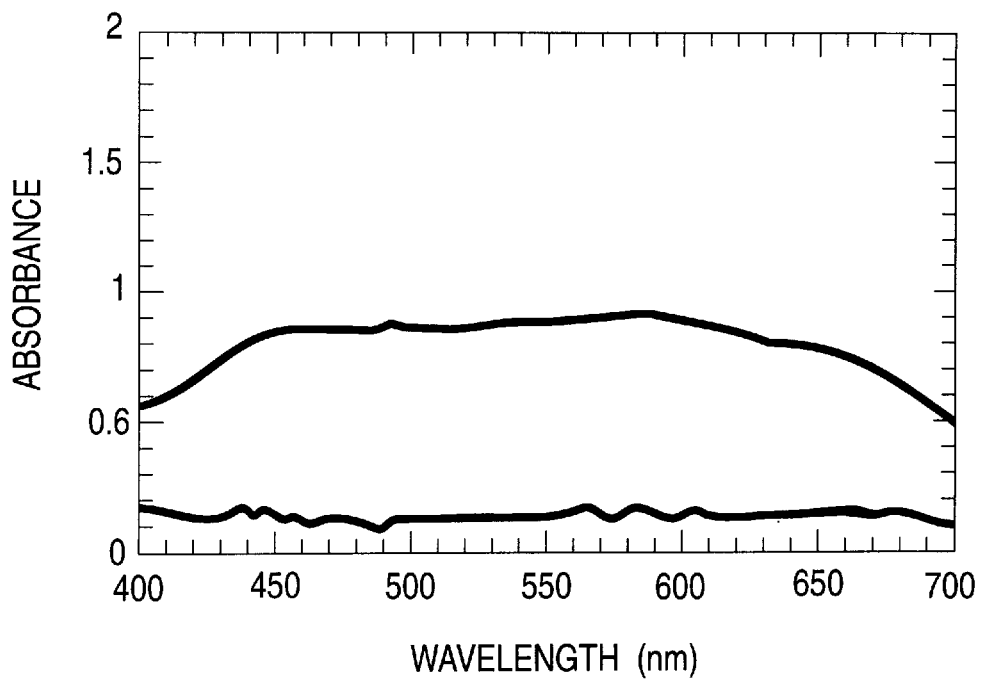
FIG. 19 is a graph of absorption spectra of a dichroic dye composition.

The liquid crystal composition of Comparative Example 6 is composed of Compounds (1) to (5), that is, azo dichroic dyes those which are not represented by the general formulae (1) to (5), and anthraquinone dichroic dyes, and an Nn liquid crystal made by Merck & Co., Inc., wherein the total amount of the dichroic dyes is 3 percent by weight of the liquid crystal. FIG. 19 is a graph of absorption spectrum of the liquid crystal composition.

Figure 20:
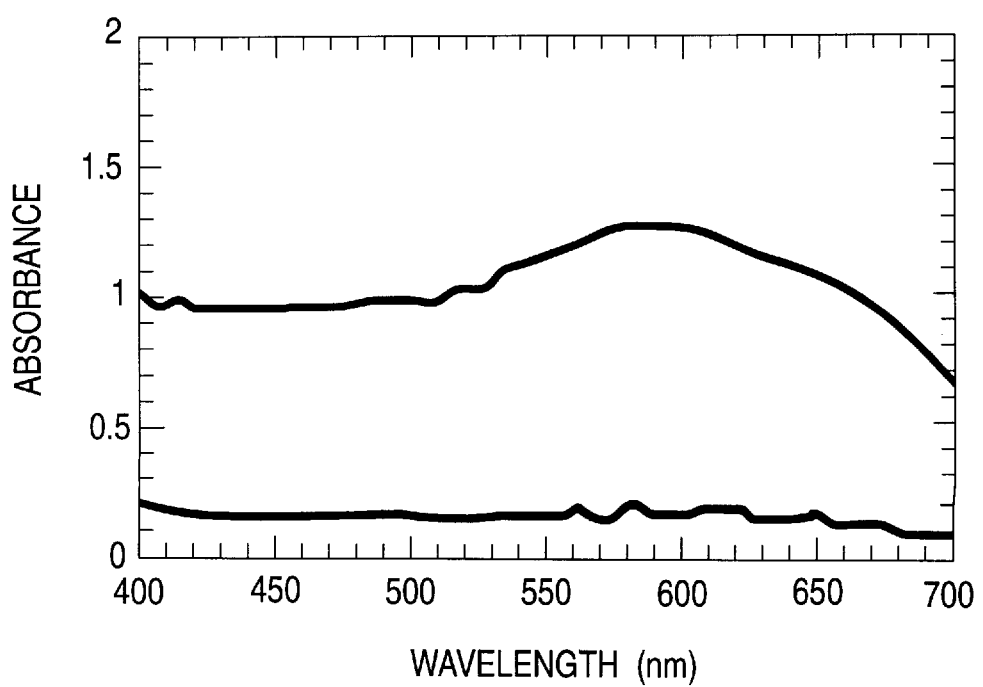
FIG. 20 is a graph of absorption spectra of a dichroic dye composition.

The liquid crystal composition of Comparative Example 7 is composed of 77 percent by weight of Compound (10) represented by the general formula (3) and Compound (11) represented by the general formula (4), 23 percent by weight of another dichroic dye, and the same liquid crystal used in the Comparative Example 6, wherein the total amount of the dyes is 3 percent by weight of the liquid crystal. FIG. 20 is a graph of the absorption spectrum of the liquid crystal composition.

Figure 21:
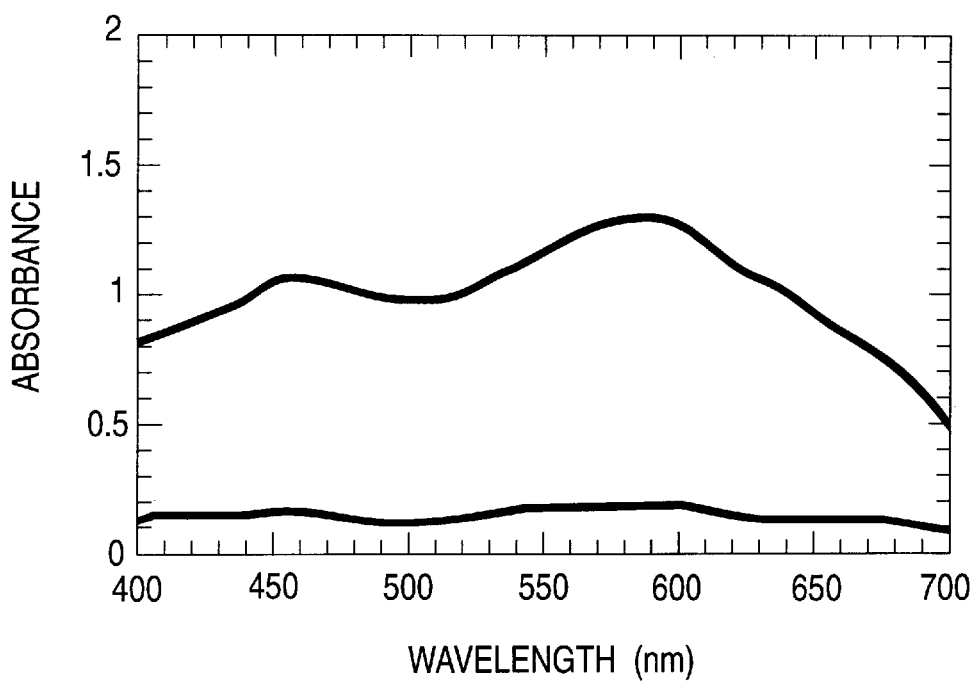
FIG. 21 is a graph of absorption spectra of a dichroic dye composition.

The liquid crystal composition of Comparative Example 8 is composed of 85 percent by weight of Compound (8) represented by the general formula (2), Compound (10) represented by the general formula (3), and Compound (11) represented by the general formula (4), 15 percent by weight of another dichroic dye, and the same liquid crystal used in the Comparative Example 6, wherein the total amount of the dyes is 3 percent by weight of the liquid crystal. FIG. 21 is a graph of the absorption spectrum of the liquid crystal composition.

Figure 22:
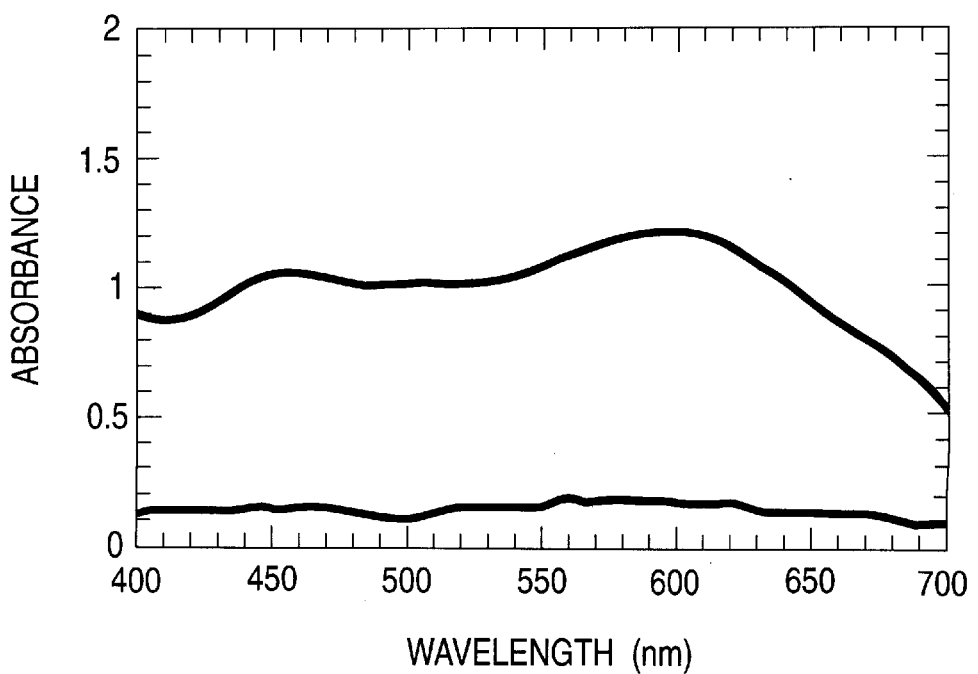
FIG. 22 is a graph of absorption spectra of a dichroic dye composition.

The liquid crystal composition of Comparative Example 9 is composed of 85 percent by weight of Compound (6) represented by the general formula (1), Compound (10) represented by the general formula (3), and Compound (11) represented by the general formula (4), 15 percent by weight of another dichroic dye, and the same liquid crystal used in the Comparative Example 6, wherein the total amount of the dyes is 3 percent by weight of the liquid crystal. FIG. 22 is a graph of the absorption spectrum of the liquid crystal composition.

Figure 23:
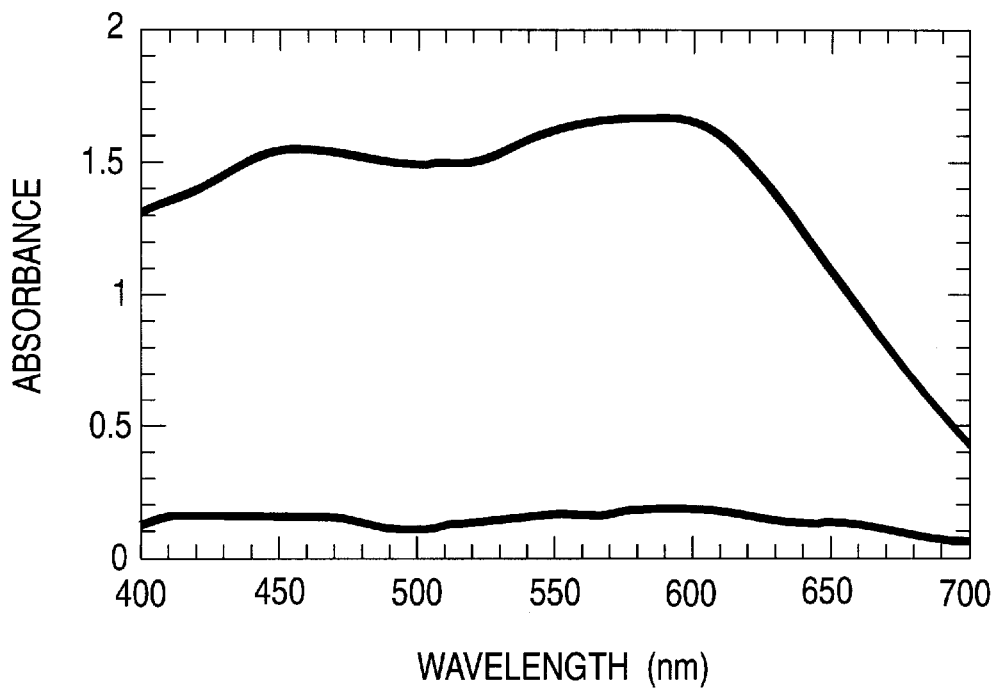
FIG. 23 is a graph of absorption spectra of a dichroic dye composition.

The liquid crystal composition of Example 3 in accordance with the present invention is composed of 75 percent by weight of Compound (6) represented by the general formula (1), Compound (8) represented by the general formula (2), and Compound (10) represented by the general formula (3), 25 percent by weight of another dichroic dye, and the same liquid crystal used in the Comparative Example 6, wherein the total amount of the dyes is 3 percent by weight of the liquid crystal. FIG. 23 is a graph of the absorption spectrum of the liquid crystal composition.

Figure 24:
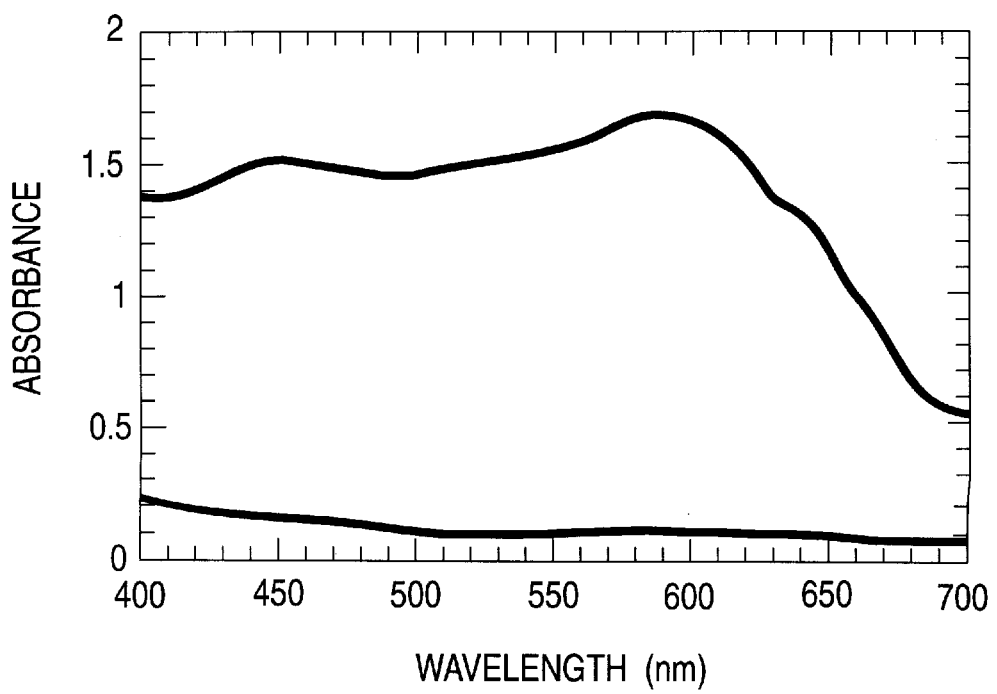
FIG. 24 is a graph of absorption spectra of a dichroic dye composition.

The liquid crystal composition of Example 4 in accordance with the present invention is composed of 75 percent by weight of Compound (7a) represented by the general formula (1), Compound (8) represented by the general formula (2) and Compound (10) represented by the general formula (3), 25 percent by weight of another dichroic dye, and the same liquid crystal used in the Comparative Example 6, wherein the total amount of the dyes is 3 percent by weight of the liquid crystal. FIG. 24 is a graph of the absorption spectrum of the liquid crystal composition.

Figure 25:
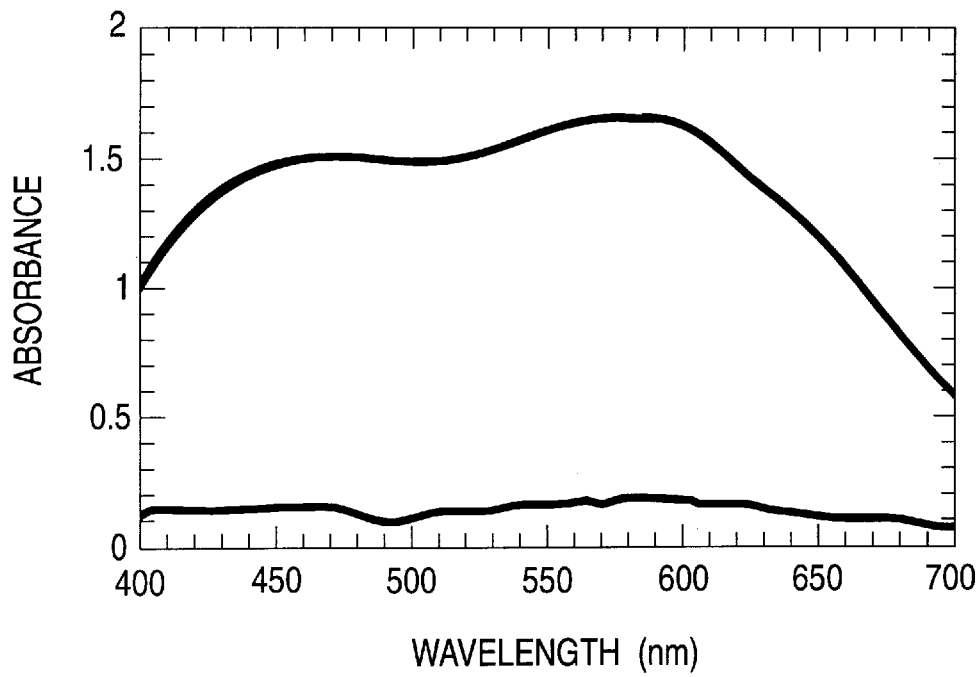
FIG. 25 is a graph of absorption spectra of a dichroic dye composition.

The liquid crystal composition of Example 5 in accordance with the present invention is composed of 75 percent by weight of Compound (6) represented by the general formula (1), Compound (8) represented by the general formula (2), and Compound (11) represented by the general formula (4), 25 percent by weight of another dichroic dye, and the same liquid crystal used in the Comparative Example 6, wherein the total amount of the dyes is 3 percent by weight of the liquid crystal. FIG. 25 is a graph of the absorption spectrum of the liquid crystal composition.

Figure 26:
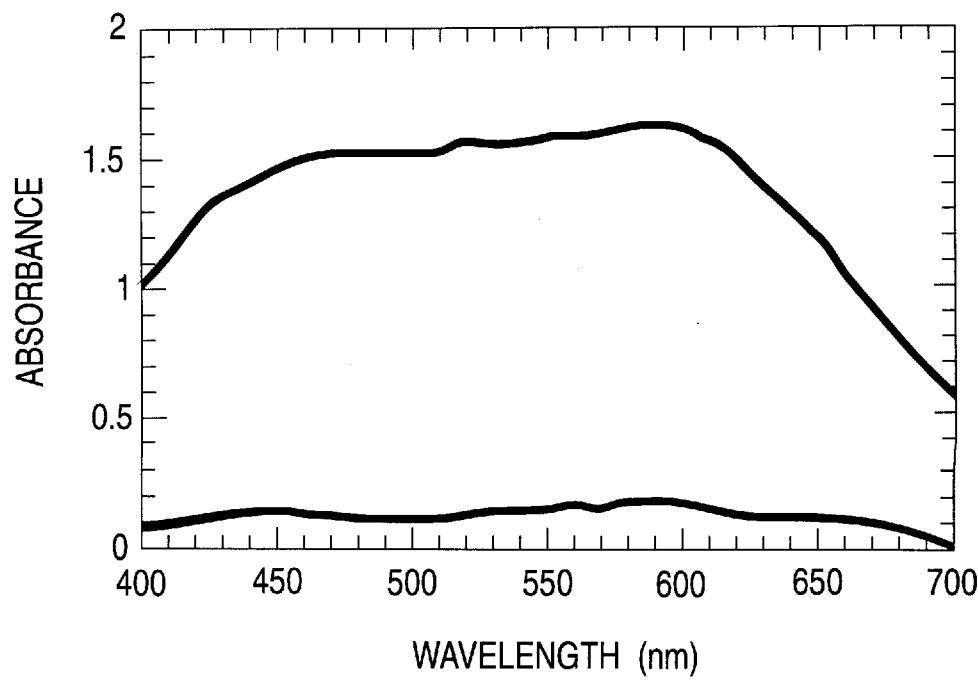
FIG. 26 is a graph of absorption spectra of a dichroic dye composition.

The liquid crystal composition of Example 6 in accordance with the present invention is composed of 75 percent by weight of Compound (7a) represented by the general formula (1), Compound (9) represented by the general formula (2), and Compound (14) represented by the general formula (5), 25 percent by weight of another dichroic dye, and the same liquid crystal used in the Comparative Example 6, wherein the total amount of the dyes is 3 percent by weight of the liquid crystal. FIG. 26 is a graph of the absorption spectrum of the liquid crystal composition.

Figure 27:
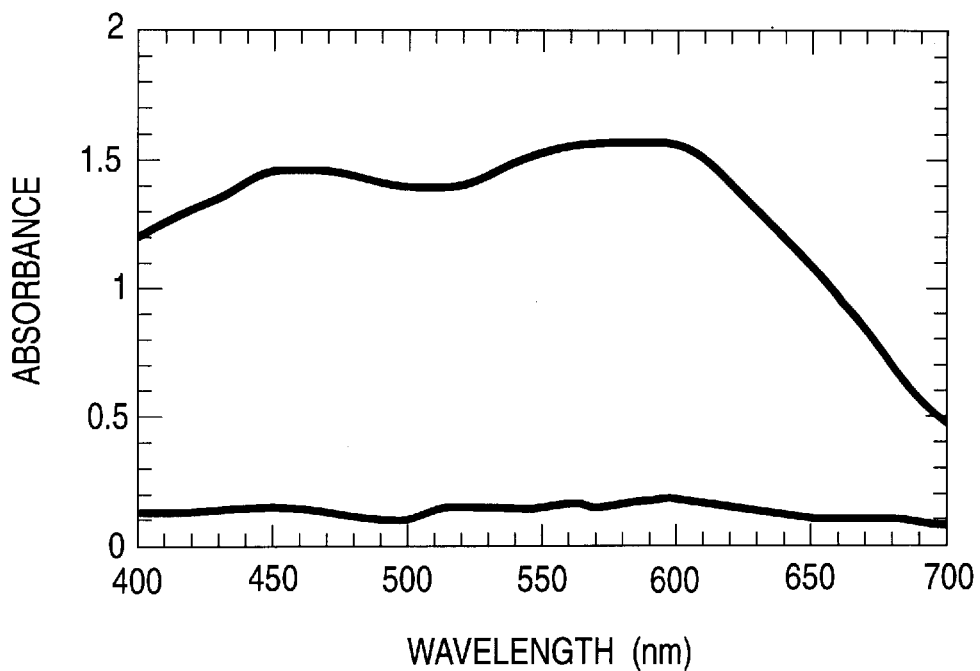
FIG. 27 is a graph of absorption spectra of a dichroic dye composition.

The liquid crystal composition of Example 7 in accordance with the present invention is composed of Compound (6) represented by the general formula (1), Compound (8) represented by the general formula (2), Compound (10) represented by the general formula (3), and the same liquid crystal used in the Comparative Example 6, wherein the total amount of the dyes is 3 percent by weight of the liquid crystal. FIG. 27 is a graph of the absorption spectrum of the liquid crystal composition.

Figure 28:
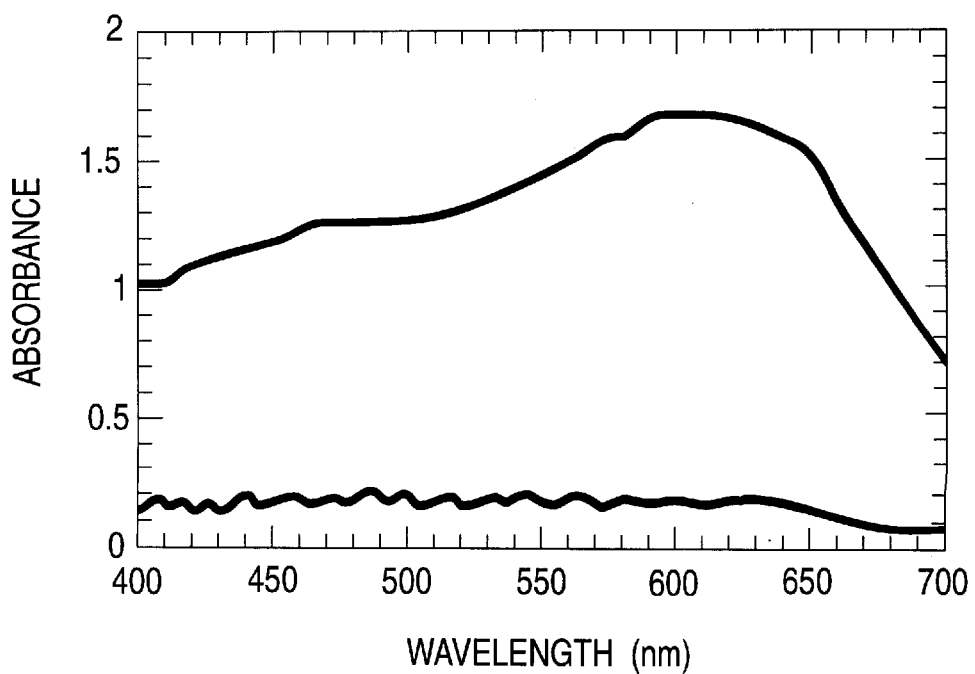
FIG. 28 is a graph of absorption spectra of a dichroic dye composition.

The liquid crystal composition of Example 8 in accordance with the present invention is composed of Compound (6) represented by the general formula (1), Compound (8) represented by the general formula (2), Compound (10) represented by the general formula (3), Compound (11) represented by the general formula (4), Compound (12) represented by the general formula (5), and the same liquid crystal used in the Comparative Example 6, wherein the total amount of the dyes is 3 percent by weight of the liquid crystal. FIG. 28 is a graph of the absorption spectrum of the liquid crystal composition.

Figure 29:
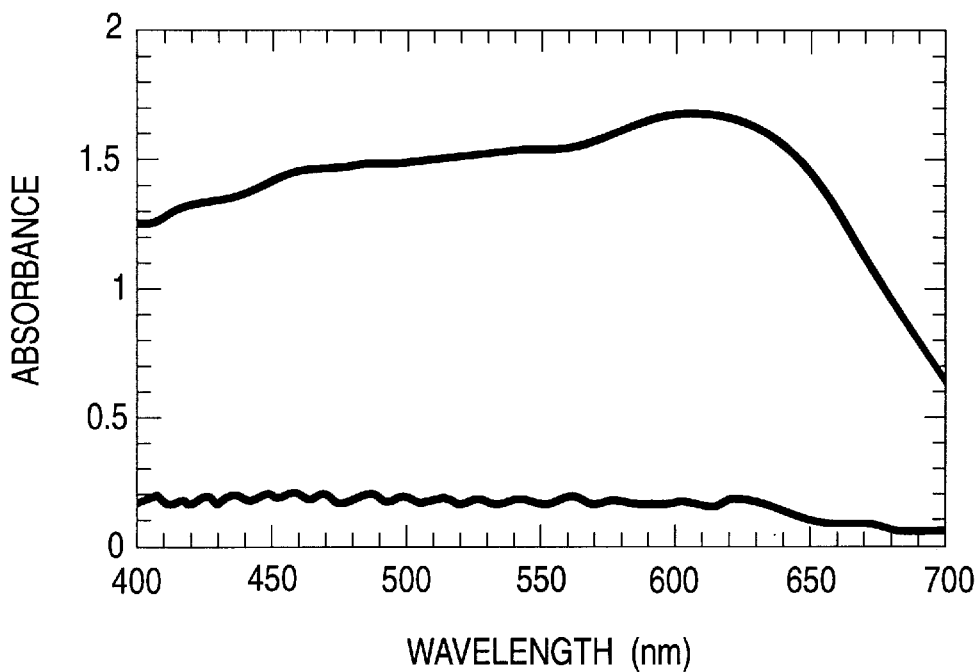
FIG. 29 is a graph of absorption spectra of a dichroic dye composition.

The liquid crystal composition of Example 9 in accordance with the present invention is composed of Compound (6) represented by the general formula (1), Compound (8) represented by the general formula (2), Compound (10) represented by the general formula (3), Compound (11) represented by the general formula (4), Compound (13) represented by the general formula (5), and the same liquid crystal used in the Comparative Example 6, wherein the total amount of the dyes is 3 percent by weight of the liquid crystal. FIG. 29 is a graph of the absorption spectrum of the liquid crystal composition.

Figure 30:
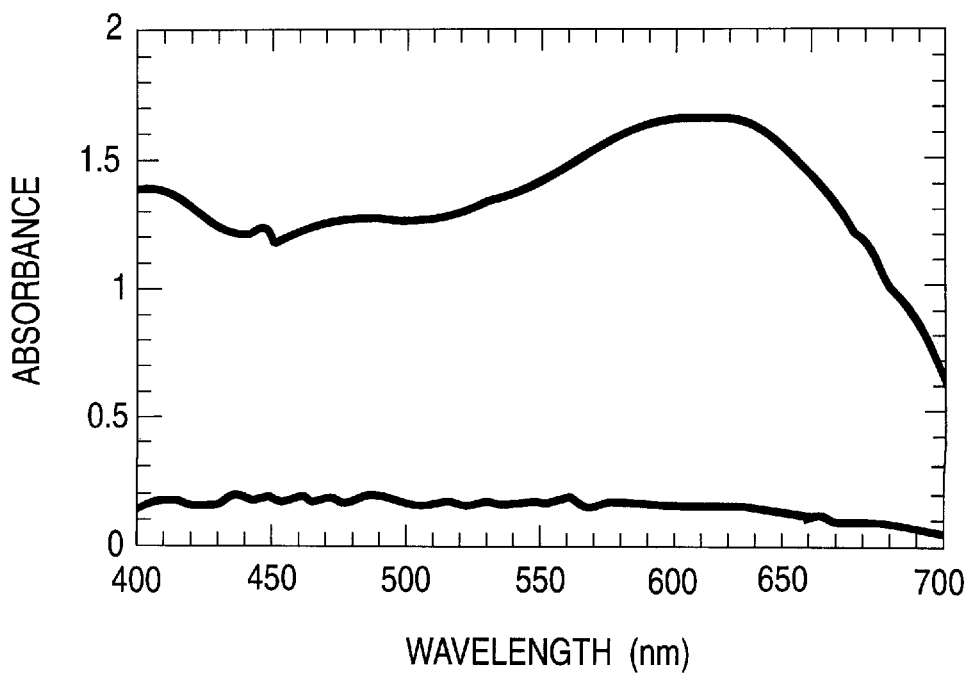
FIG. 30 is a graph of absorption spectra of a dichroic dye composition.

The liquid crystal composition of Example 10 in accordance with the present invention is composed of Compound (6) represented by the general formula (1), Compound (8) represented by the general formula (2), Compound (10) represented by the general formula (3), Compound (11) represented by the general formula (4), Compound (14) represented by the general formula (5), and the same liquid crystal used in the Comparative Example 6, wherein the total amount of the dyes is 3 percent by weight of the liquid crystal. FIG. 30 is a graph of the absorption spectrum of the liquid crystal composition.

In the above-mentioned embodiment, bluish dichroic dyes have been principally described. For preparing dichroic dye mixtures having a black color, reddish dyes, as well as bluish dyes, must be added. Hereinafter, black dye mixtures containing bluish and reddish dyes will be described in detail. A dichroic dye mixture in accordance with the following embodiment is composed of at least two dyes among a bis-azo blue dye with a thienothiazole ring represented by the following chemical formula (1), a tris-azo bluish purple dye with a benzothiazole ring represented by the following chemical formula (2), and a bis-azo reddish purple dye with a thienothiazole ring represented by the following chemical formula (3):

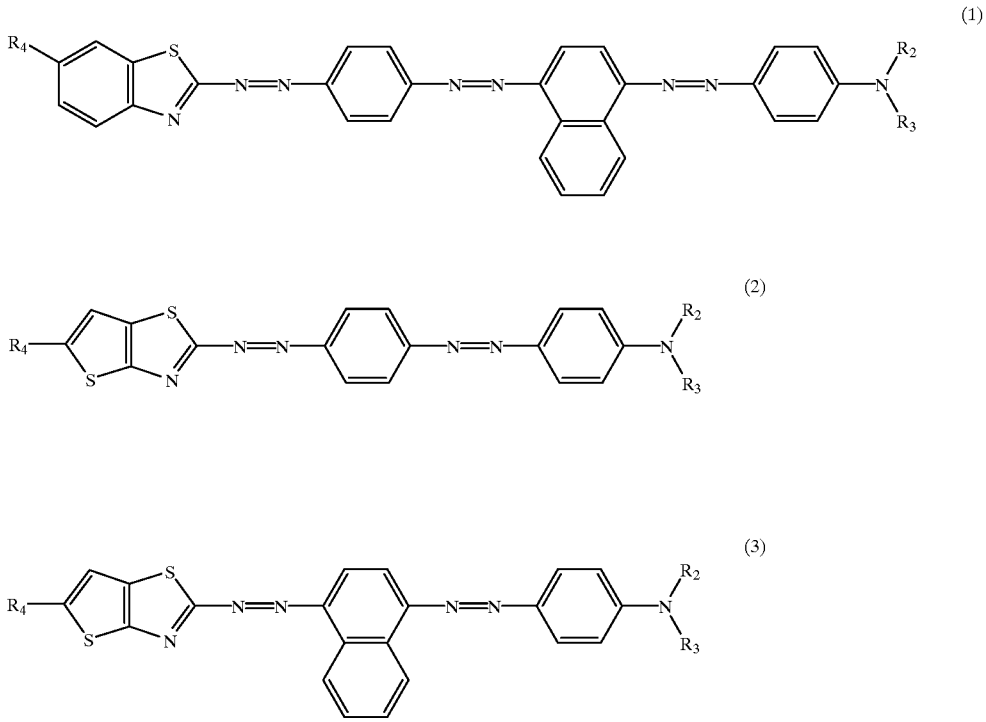

wherein $R_1$ is a hydrogen or halogen atom, $C_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; each of $R_2$ and $R_3$ is a hydrogen atom or $C_nH_{2n+1}$; $R_3$ may be

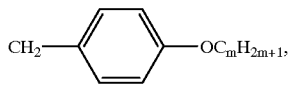

or

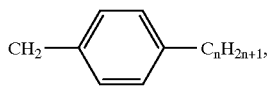

and a combination of $R_2$ and $R_3$ may form

wherein n is an integer from 1 to 8, and m is an integer from 1 to 5; and $R_4$ is a hydrogen or halogen atom, or $C_nH_{2n+1}$, wherein n is an integer from 1 to 8.

The dichroic dye mixture shows a black color when it is dissolved into a guest-host liquid crystal. It is preferable that the dichroic dye mixture contains all these three color dyes, i.e., the bis-azo blue dye, the tris-azo bluish purple dye, and the bis-azo reddish purple dye. The dichroic dye mixture may contain additional dyes, if necessary, to have a clear black color. Since the blue dye, bluish purple dye, and reddish purple dye used in this embodiment have high dichroic ratios and remarkably high absorption coefficients, a reflective-type guest-host liquid crystal display device having a black color with a high contrast is obtained by adding a small amount of the dichroic dye mixture into a liquid crystal. The reddish purple dichroic dye in accordance with the present invention has a higher solubility in the liquid crystal than that of conventional reddish purple dichroic dyes. The blue dichroic dye and the bluish purple dichroic dye have been described above.

FIG. 31 includes typical bis-azo blue dyes with a thienothiazole ring represented by the chemical formula (1), as well as, each wavelength ($\lambda_{max}$) at which maximum absorption occurs, and each dichroic ratio. Into a nematic liquid crystal E-7 made by BDH Ltd., 1.0 percent by weight of a dichroic dye mixture was dissolved, and the liquid crystal composition was held in a 10-$\mu$m space between a pair of horizontally oriented substrates. The wavelength ($\lambda_{max}$) at which maximum absorption occurs, and the dichroic ratio were determined with an instantaneous multiple photodetector with a polarizing plate. FIG. 32 includes typical tris-azo bluish purple dyes with a benzothiazole ring represented by the chemical formula (2), and FIG. 33 includes typical bis-azo reddish purple dyes with a benzothiazole ring represented by the chemical formula (3).

Some liquid crystal compositions were prepared by combining various dichroic dyes A to K shown in FIGS. 34 to 36. Dichroic dye H is represented by the chemical formula (1), dichroic dye G is represented by the chemical formula (2), and dichroic dyes F and I are represented by the chemical formula (3). Other dichroic dyes A, B, C, E, J, and K do not belong to any one of the chemical formulae (1) to (3).

Figure 37:
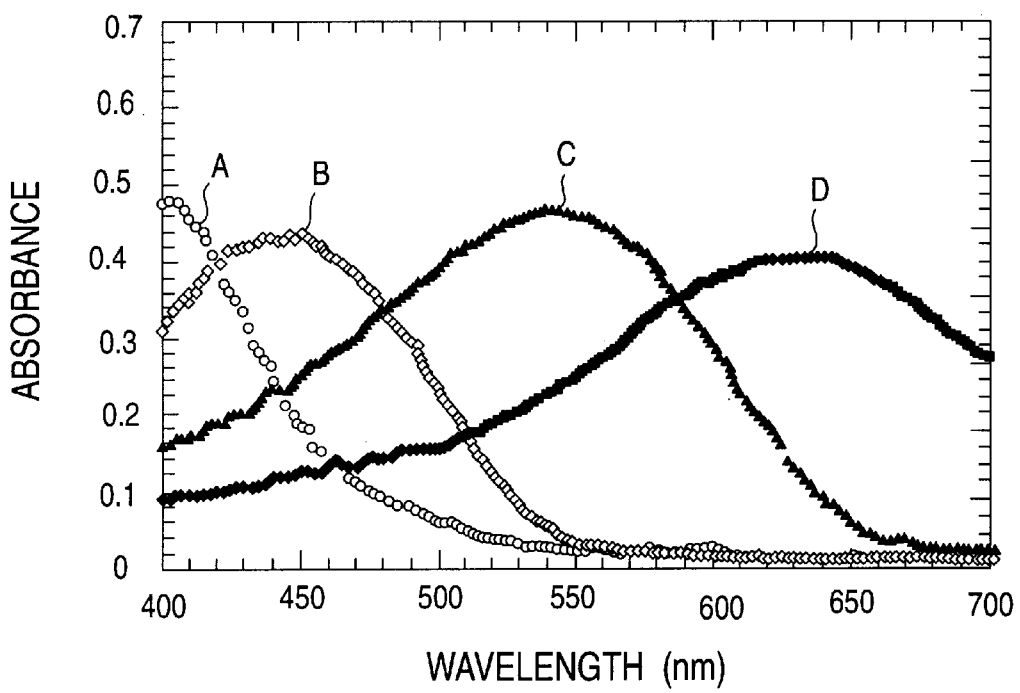
FIG. 37 is a graph of absorption spectra of dichroic dyes used in Comparative Example in accordance with the present invention.

A liquid crystal composition of Comparative Example was prepared by compounding the dyes A, B, C and D. FIG. 37 is a graph of absorption spectra of the dyes A, B, C and D, wherein the spectra were measured as follows. A guest-host liquid crystal composed of 1 percent by weight of each dye and a nematic liquid crystal having negative dielectric anisotropy was held into a vertically oriented cell with a gap of 5 μm. An alternating voltage of 4.5 volts and 60 Hz was applied to the liquid crystal cell to measure the absorption spectrum.

Figure 38:
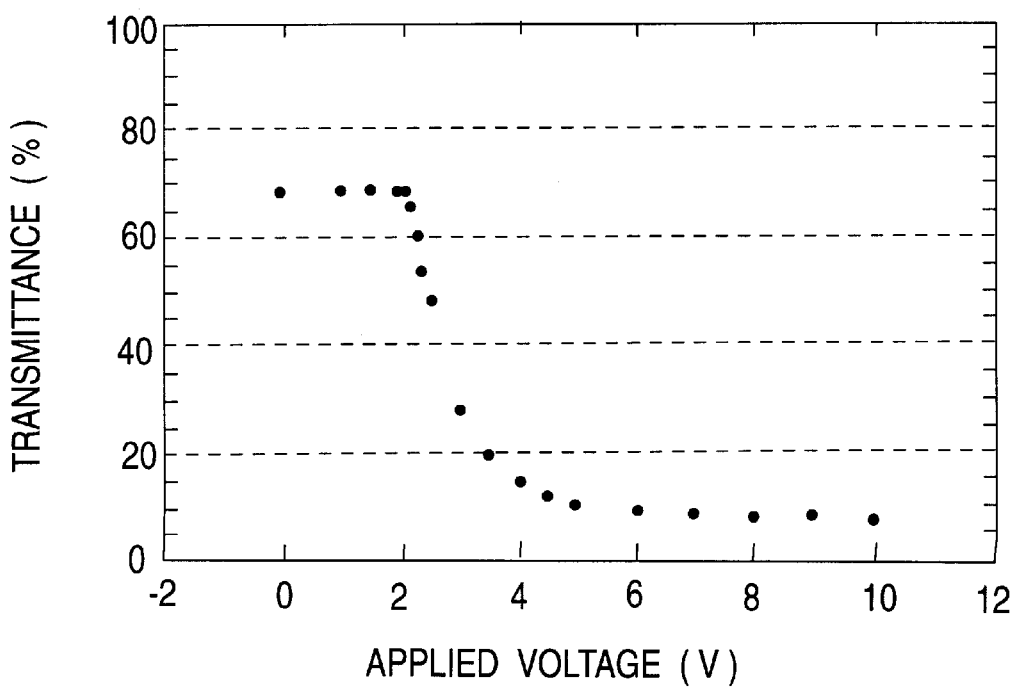
FIG. 38 is a graph of applied voltage-transmittance characteristics of a liquid crystal panel of Comparative Example in accordance with the present invention.

Dyes A, B, C, and D were mixed in a ratio of A:B:C:D= 4:4:7:20, and 3 percent by weight of the mixture was dissolved into a nematic liquid crystal having negative dielectric anisotropy (made by Merck & Co., Inc.) to prepare a liquid crystal composition of the Comparative Example. The liquid crystal composition was held into a liquid crystal cell composed of a pair of substrates with a 5-μm gap, each being provided with a transparent electrode and a vertically oriented film. The liquid crystal cell has been described with reference to FIGS. 14 to 16. The optical characteristics of the cell containing the liquid crystal composition were determined with an instantaneous multiple photodetector. An AC pulse voltage with 60 Hz was applied to the liquid crystal cell. FIG. 38 is a graph illustrating the correlation between the transmittance and an applied voltage or driving voltage when a plane-polarized light parallel to the axis of the molecular orientation of the dyes was radiated. FIG. 38 demonstrates that the liquid crystal begins to be aligned at approximately 2 volts and the alignment is saturated at 10 volts.

Figure 39:
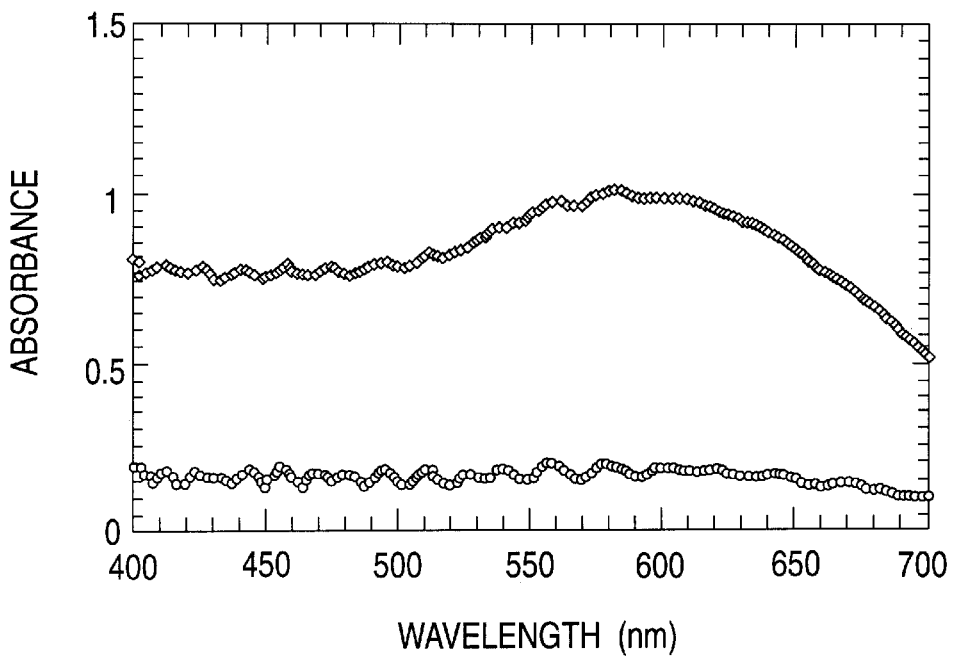
FIG. 39 is a graph of absorption spectra of a liquid crystal cell of the Comparative Example in accordance with the present invention.
Figure 40:
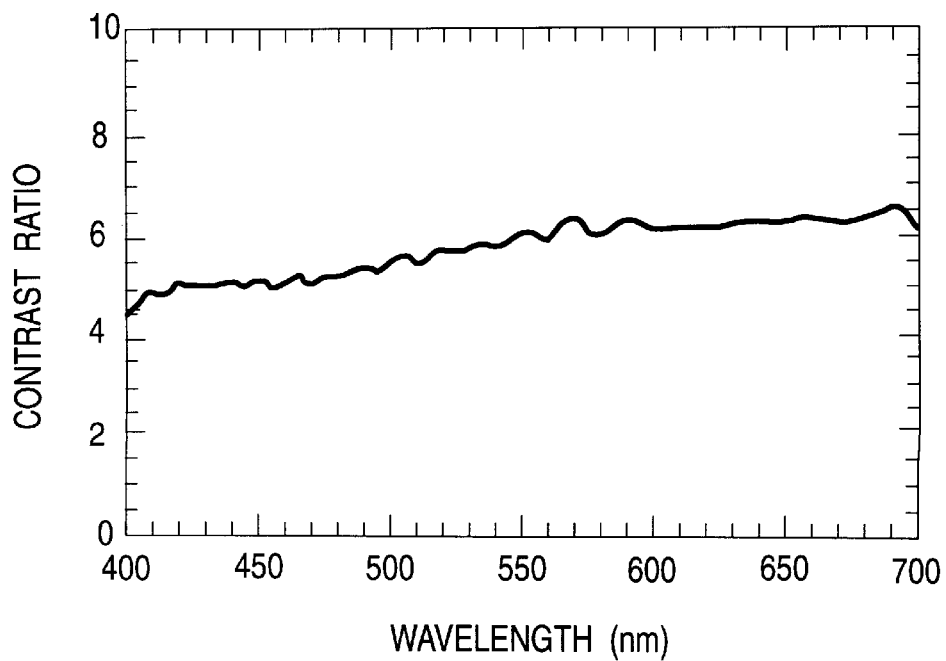
FIG. 40 is a graph of a contrast ratio of a liquid crystal cell of the Comparative Example in accordance with the present invention.

A voltage in which the transmittance decreased by 90%, that is, 4.2 volts was set as a standard voltage. FIG. 39 is a graph of absorption spectra at applied voltages of 4.5 volts and 0 volts. FIG. 40 is a graph of the ratio of the absorbance $A_{on}$ at 4.5 volts to the absorbance $A_{off}$ at 0 volts, which is referred to as a contrast ratio.

In the liquid crystal composition of the Comparative Example, the blue dye D has a lower absorbance and a lower dichroic ratio than those of the other dyes A, B or C, as shown in FIG. 37, hence the content of the blue dye D is relatively high in the composition to prevent the formation of a reddish black color, to reduce the transmittance in the region of more than 650 nm, or to increase the absorbance at near 600 nm in which the human eye is highly sensitive.

Figure 41:
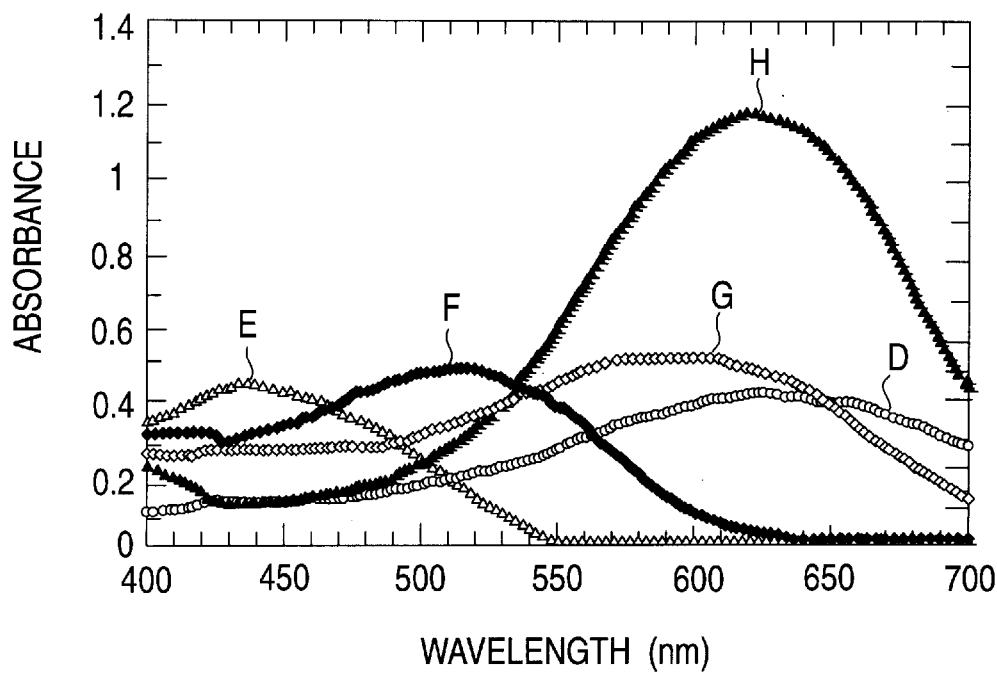
FIG. 41 is a graph of absorption spectra of dichroic dyes used in an Example in accordance with the present invention.
Figure 42:
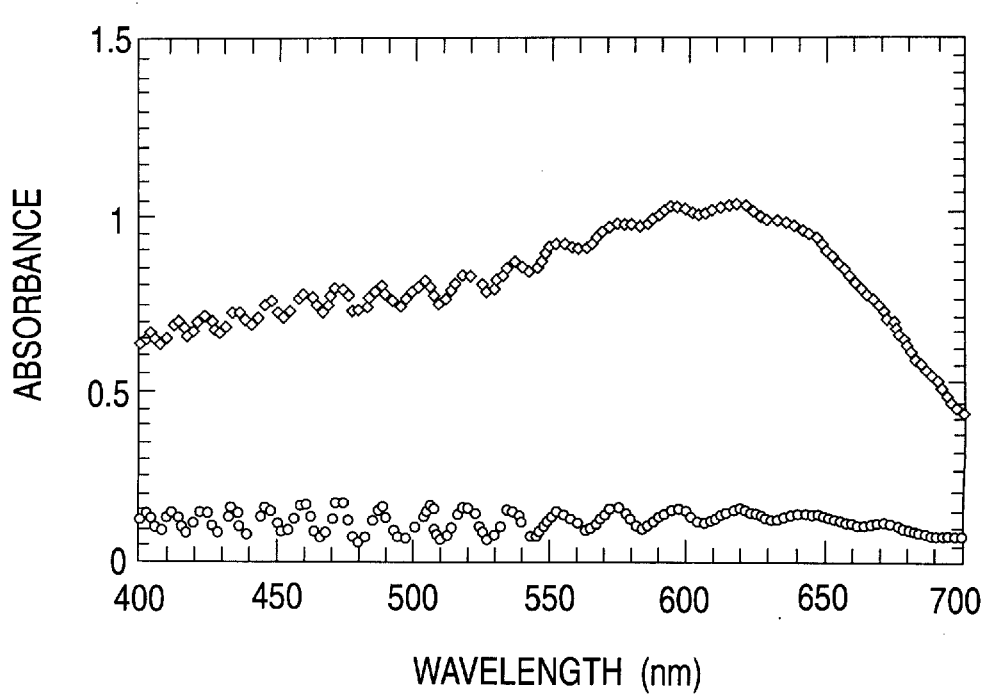
FIG. 42 is a graph of absorbance of a liquid crystal cell of the Example in accordance with the present invention.
Figure 43:
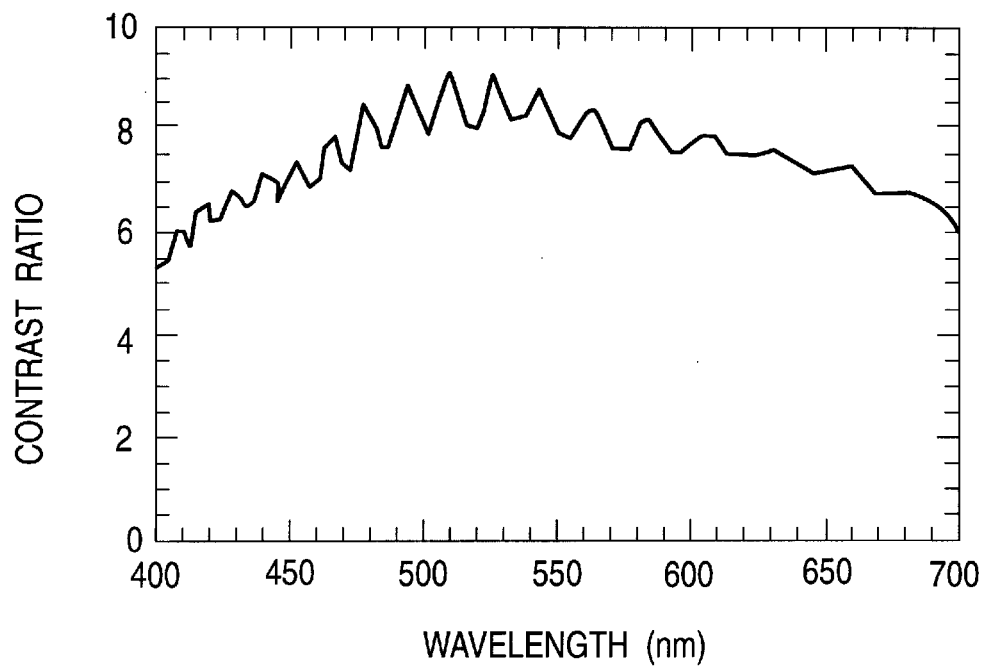
FIG. 43 is a graph of a contrast ratio of a liquid crystal cell of the Example in accordance with the present invention.

In Example 1 in accordance with the present invention, a black dichroic dye mixture was prepared by compounding the blue dye D, the yellow dye E, the red dye F, the bluish purple dye G, and the blue dye H in a ratio of D:E:F:G:H= 2:1:1:1:1, and 3 percent by weight of the dye mixture was dissolved into a nematic liquid crystal having negative dielectric anisotropy made by Merck & Co., Inc. The liquid crystal composition was held into a liquid crystal cell provided with vertically oriented films as in the Comparative Example. FIG. 41 is a graph of absorption spectra of the dyes. The optical characteristics of the liquid crystal cell were measured with an instantaneous multiple photodetector as described above. FIG. 42 is a graph of absorbances at applied voltages of 4.5 volts and 0 volts. FIG. 43 is a graph of the contrast ratio at an applied voltage of 4.5 volts to that of 0 volts. Each of the bis-azo blue dye H with a thienothiazole ring and the tris-azo bluish purple dye G used in the Example 1 has a large absorption coefficient and a large dichroic ratio. The liquid crystal composition also contains a bis-azo red dye having a thienothiazole ring. All these dyes have relatively large absorbances as shown in FIG. 41, and high dichroic ratios as shown in FIGS. 31 to 33. As a result, a black color can be formed by the addition of a smaller quantity of dye D compared with the Comparative Example. FIG. 42 illustrates that the absorbance of Example 1 is larger than that of the Comparative Example. If the absorbance is reduced to the same level as that of the Comparative Example, the total content of the dyes can be reduced, hence the precipitation of the dyes can be prevented at a low temperature region, resulting in improved reliability of the liquid crystal display device. The contrast ratio of the Example 1 ranges from 6 to 8, and is higher than that of the Comparative Example ranging from 5 to 6. The contrast ratio will further increase when the applied voltage is increased.

Figure 44:
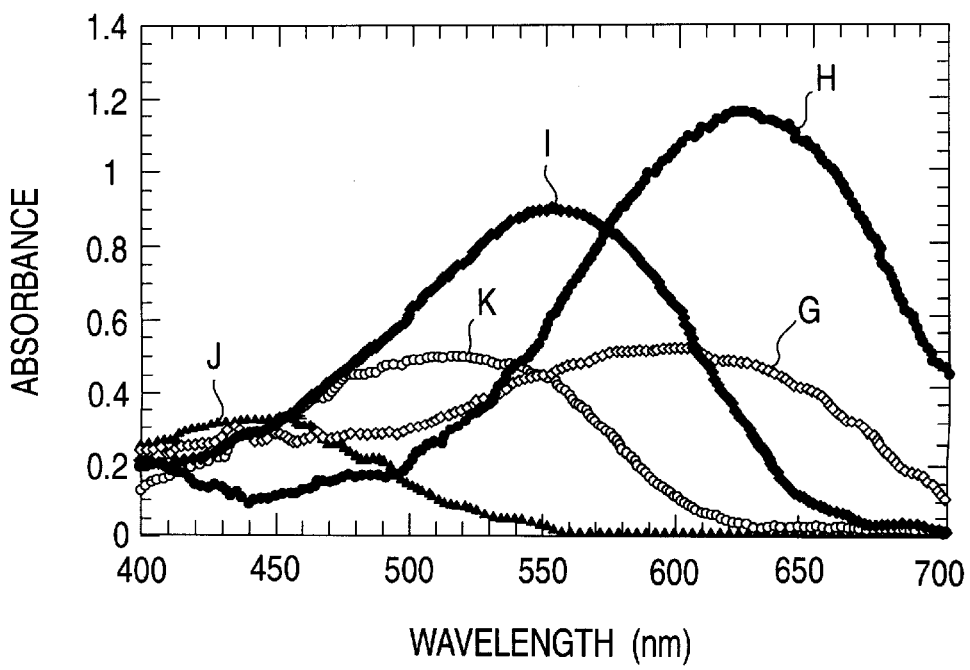
FIG. 44 is a graph of absorption spectra of dichroic dyes used in another Example in accordance with the present invention.
Figure 45:
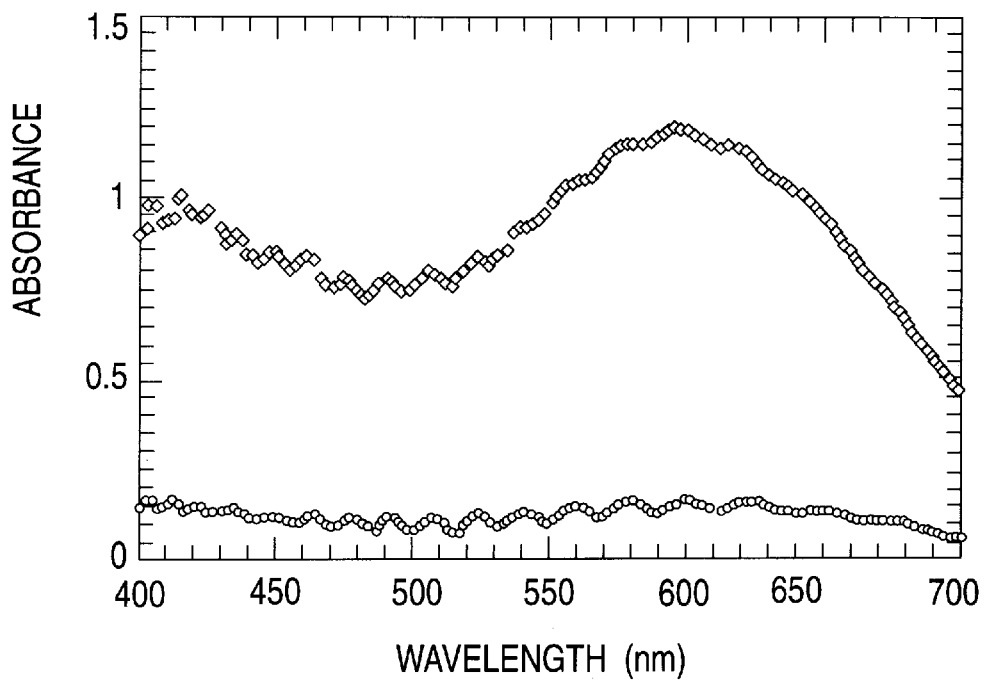
FIG. 45 is a graph of absorbance of a liquid crystal cell of the Example in accordance with the present invention.
Figure 46:
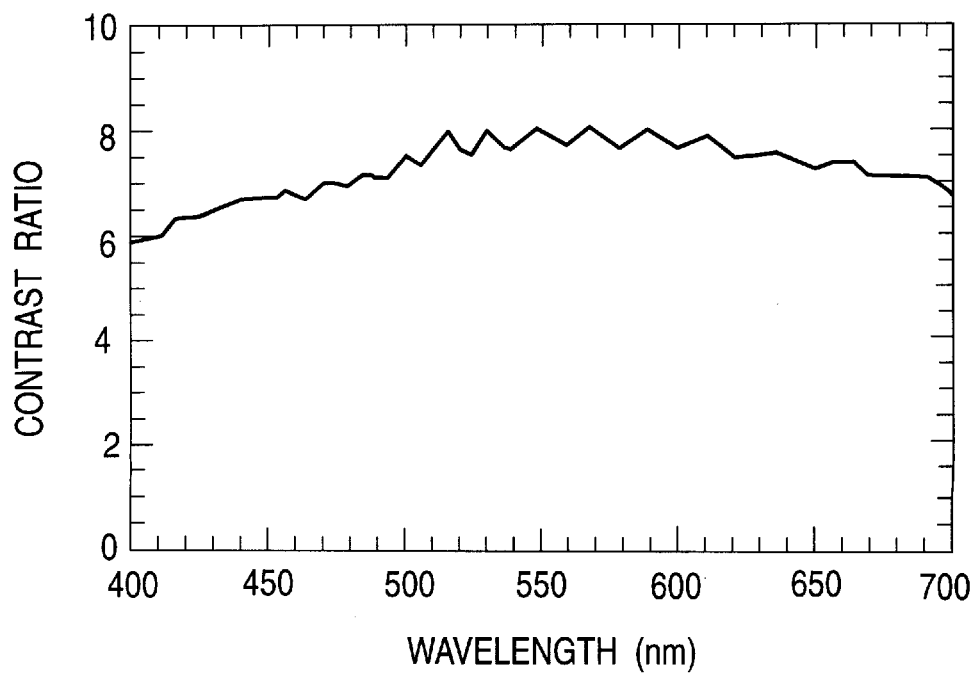
FIG. 46 is a graph of a contrast ratio of a liquid crystal cell of the Example in accordance with the present invention.

In Example 2 in accordance with the present invention, a black dichroic dye mixture was prepared by compounding the the red dye K, the yellow dye J, the blue dye H, the reddish purple dye I, and the bluish purple dye G in a ratio of K:J:H:I:G=6:9:5:5:5, and 3 percent by weight of the dye mixture was dissolved into a nematic liquid crystal having negative dielectric anisotropy made by Merck & Co., Inc. The liquid crystal composition was held into a liquid crystal cell provided with vertically oriented films as in the Comparative Example. The optical characteristics of the liquid crystal cell were measured with the above-mentioned instantaneous multiple photodetector. FIG. 45 is a graph of absorbances at applied voltages of 4.5 volts and 0 volts. FIG. 46 is a graph of the contrast ratio at an applied voltage of 4.5 volts to that of 0 volts. Each of the bis-azo blue dye H with a thienothiazole ring and the bis-azo reddish purple dye I with a thienothiazole ring used in the Example 2 has a large absorption coefficient and a large dichroic ratio. These dyes have relatively large absorbances as shown in FIG. 44, and high dichroic ratios as shown in FIGS. 31 to 33. As a result, a black color can be formed by the addition of a smaller quantities of dyes compared with the Comparative Example. FIG. 45 illustrates that the absorbance of Example 2 is larger than that of the Comparative Example. If the absorbance is reduced to the same level as that of the Comparative Example, the total content of the dyes can be reduced, hence the precipitation of the dyes can be prevented at a low temperature region, resulting in improved reliability of the liquid crystal display device. The contrast ratio of the Example 2 ranges from 6 to 8, and is higher than that of the Comparative Example ranging from 5 to 6. The contrast ratio will further increase when the applied voltage is increased.

Figure 47:
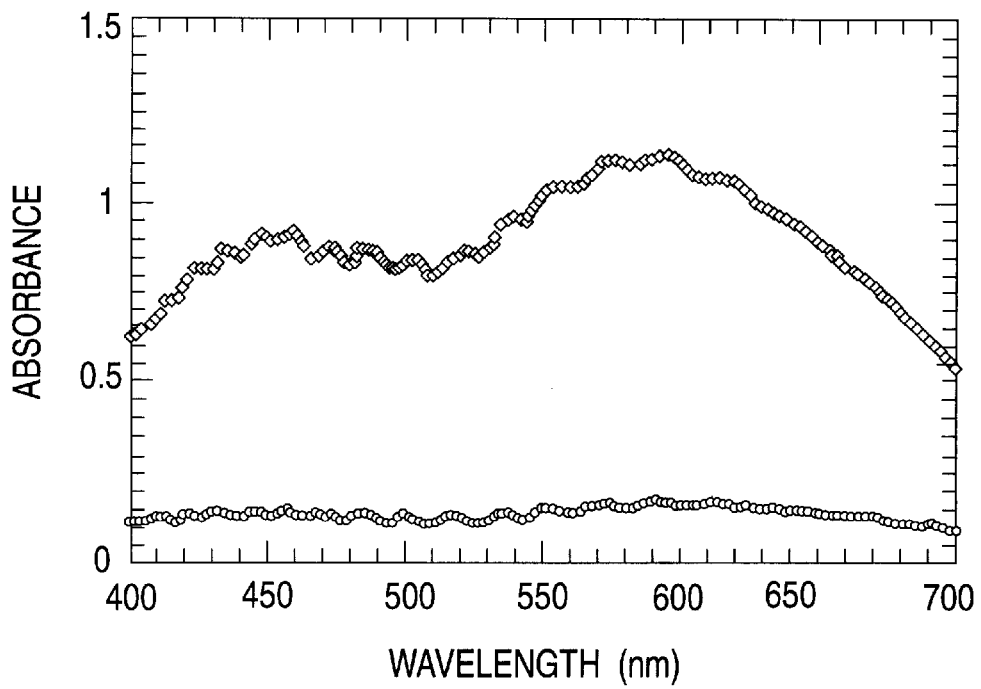
FIG. 47 is a graph of absorbance of dichroic dyes used in a further Example in accordance with the present invention.
Figure 48:
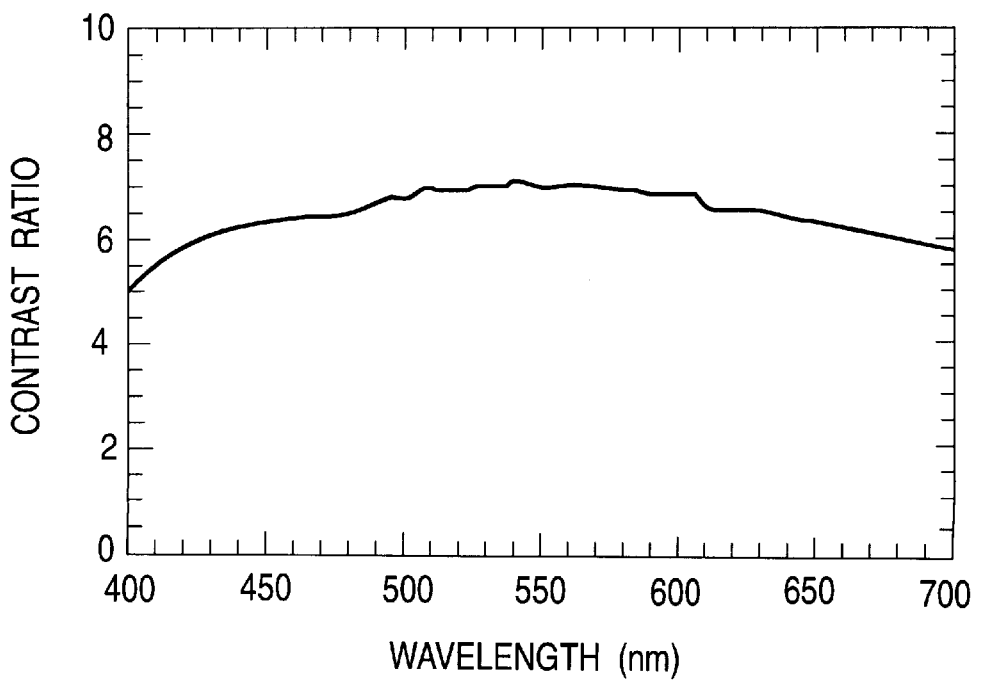
FIG. 48 is a graph of a contrast ratio of a liquid crystal cell of the Example in accordance with the present invention.

In Example 3 in accordance with the present invention, a black dichroic dye mixture was prepared by compounding the blue dye D, the bluish purple dye G, the reddish purple dye I, the yellow dye J, and the red dye K, in a ratio of D:G:I:J:K=20:5:3:10:3, and 3 percent by weight of the dye mixture was dissolved into a nematic liquid crystal having negative dielectric anisotropy made by Merck & Co., Inc. The liquid crystal composition was held into a liquid crystal cell provided with vertically oriented films as in the Comparative Example. The optical characteristics of the liquid crystal cell were measured with the above-mentioned instantaneous multiple photodetector. FIG. 47 is a graph of absorbances at applied voltages of 4.5 volts and 0 volts. FIG. 48 is a graph of the contrast ratio at an applied voltage of 4.5 volts to that of 0 volts. Each of the tris-azo bluish purple dye G with a benzothiazole ring and the bis-azo reddish purple dye I with a thienothiazole ring used in the Example 2 has a large absorption coefficient and a large dichroic ratio. Also, in the Example 2, the contrast ratio 2 ranges from 6 to 7.

Figure 49:
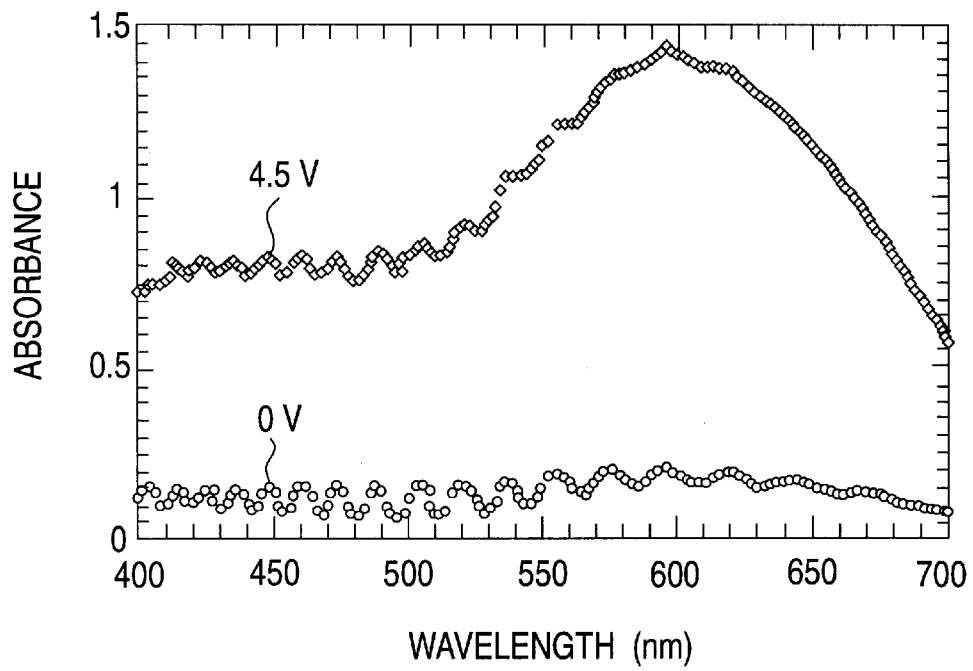
FIG. 49 is a graph of absorbance of dichroic dyes used in a still another Example in accordance with the present invention.
Figure 50:
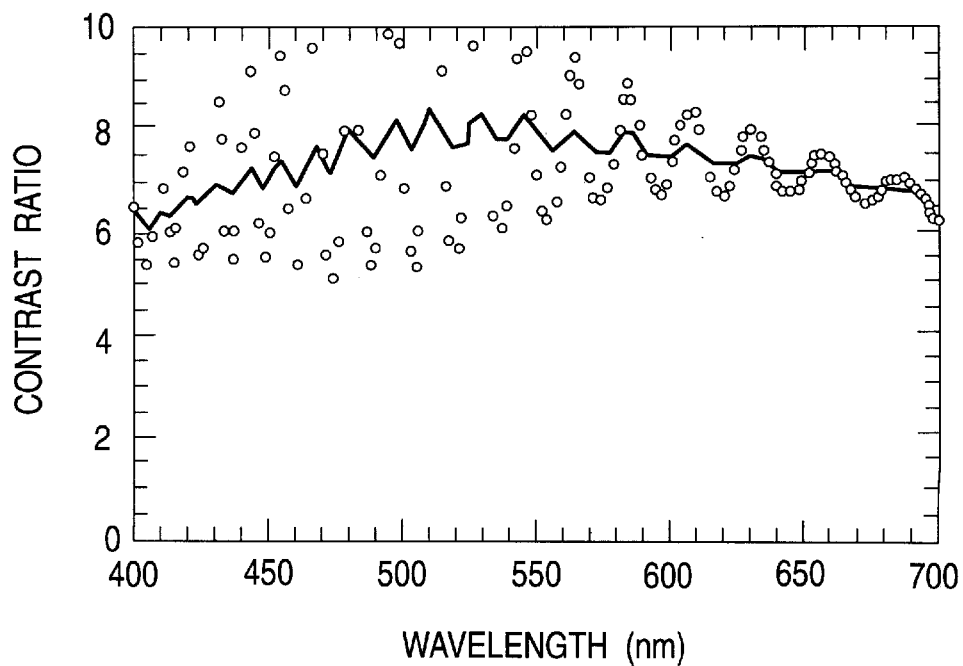
FIG. 50 is a graph of a contrast ratio of a liquid crystal cell of the Example in accordance with the present invention.

In Example 4 in accordance with the present invention, a black dichroic dye mixture was prepared by compounding the the yellow dye A, the blue dye D, the yellow dye E, the bluish purple dye G, the blue dye H, the reddish purple dye I, the yellow dye J, and the red dye K, in a ratio of A:D:E:G:H:I:J:K=4:10:2:2:2:14:7, and 3 percent by weight of the dye mixture was dissolved into a nematic liquid crystal having negative dielectric anisotropy made by Merck & Co., Inc. The liquid crystal composition was held into a liquid crystal cell provided with vertically oriented films as in the Comparative Example. The optical characteristics of the liquid crystal cell were measured with the above-mentioned instantaneous multiple photodetector. FIG. 49 is a graph of absorbances at applied voltages of 4.5 volts and 0 volts. FIG. 50 is a graph of the contrast ratio at an applied voltage of 4.5 volts to that of 0 volts. Each of the bis-azo blue dye H with a thienothiazole ring, the tris-azo bluish purple dye G with a benzothiazole ring, and the bis-azo reddish purple dye I with a thienothiazole ring used in the Example 2 has a large absorption coefficient and a large dichroic ratio. Also, in the Example 3, the contrast ratio ranges from 6 to 8.

As described above, a bluish purple dye, a blue dye, and a reddish purple dye in accordance with the present invention have significantly high dichroic ratios and absorption coefficients, hence a reflection-type guest-host liquid crystal display device with a significantly high contrast of a black color can be obtained by compounding a small amount of black color dye mixture containing these dyes as major components into a host liquid crystal. Such a high contrast, which has not been achieved in any prior art technologies, permits full color displaying of the reflection-type guest-host liquid crystal display device with a color filter. Since these dyes do not cause the deterioration of the response time because of the decreased viscosity of the liquid crystal, the displaying of moving images can be satisfactorily achieved by a reflection-type guest-host liquid crystal display device using a liquid crystal composition containing a nematic liquid crystal having a quick response time and a mixture of these dyes. Such a reflection-type guest-host liquid crystal display device capable of displaying full color moving images is useful in displays for advanced portable personal information terminals.

What is claimed is:

1. A guest-host liquid crystal display device comprising:
   a pair of substrates opposing each other with a space therebetween;
   a guest-host liquid crystal held in said space, said guest-host liquid crystal containing a mixture of dichroic dyes exhibiting a black color as a whole, said mixture of dichroic dyes is present in an amount less than or equal to 5 percent by weight; and
   electrodes provided on said substrates for applying a voltage to said guest host liquid crystal;
   said mixture of dichroic dyes comprising a bis-azo blue dye having a thienothiazole ring represented by the following chemical formula (1) and a tris-azo bluish purple dye having a benzothiazole ring represented by the following chemical formula (2):

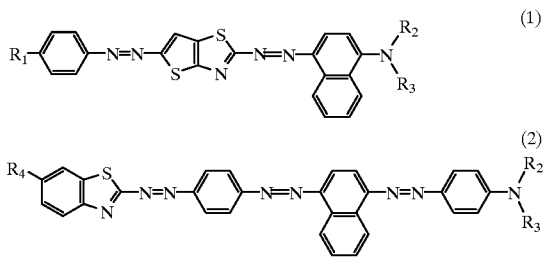

wherein $R_1$ is a hydrogen or halogen atom, $C_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; each of $R_2$ and $R_3$ is a hydrogen atom or $C_nH_{2n+1}$; $R_3$ may be

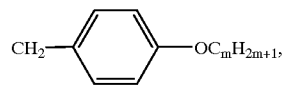

or

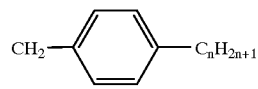

and a combination of $R_2$ and $R_3$ may form

wherein n is an integer from 1 to 8, and m is an integer from 1 to 5; and $R_4$ is a hydrogen or halogen atom, or $C_nH_{2n+1}$, wherein n is an integer from 1 to 8.

2. A guest-host liquid crystal display device according to claim 1, wherein said mixture of dichroic dyes are added to said guest-host liquid crystal in an amount of 1.0 to 5.0 percent by weight.

3. A guest-host liquid crystal display device according to claim 1, wherein said guest-host liquid crystal comprises a nematic liquid crystal having a negative dielectric anisotropy, and is aligned perpendicularly to said substrates.

4. A guest-host liquid crystal display device according to claim 3, wherein said nematic liquid crystal comprises a fluorophenylcyclohexane compound.

5. A guest-host liquid crystal display device according to claim 1, wherein a first substrate among said substrates is transparent and lies at the incident side, and a second substrate faces said first substrate and is provided with a reflecting layer and $(2n+1)\lambda/4$ ($n=\pm 0, 1, 2, 3 \ldots$) layers thereon in that order.

6. A guest-host liquid crystal composition comprising:
   a dichroic dye mixture comprising a bis-azo dye having a thienothiazole ring chromophoric group and a tris-azo dye having a benzothiazole chromophoric group; and
   a guest-host liquid crystal dissolving said dichroic dye mixture as a guest substance, wherein said dichroic dye mixture is present in an amount equal to or less than 5 percent by weight.

7. A guest-host liquid crystal composition according to claim 6, wherein said host liquid crystal comprises a nematic liquid crystal having a negative dielectric anisotropy.

8. A guest-host liquid crystal composition according to claim 7, wherein said nematic liquid crystal comprises a fluorophenylcyclohexane compound showing a nematic phase at room temperature.

9. A guest-host liquid crystal displace device comprising:
   a pair of substrates opposing each other with a space therebetween;
   a guest-host liquid crystal held in said space, said guest-host liquid crystal exhibiting a black color as a whole and containing a mixture of dichroic dyes, said mixture of dichroic dyes is present in an amount equal to or less than 5 weight percent; and
   electrodes provided on said substrates for applying a voltage to said guest-host liquid crystal;
   said mixture of dichroic dyes comprising a dye represented by the following chemical formula (1); a dye represented by the following chemical formula (2), and at least one dye selected from the group consisting of dyes represented by the following general formulae (3), (4) and (5):

(1)

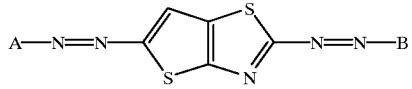

wherein A is

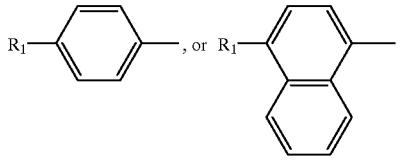

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; and B is

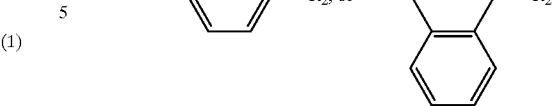

wherein $R_2$ is

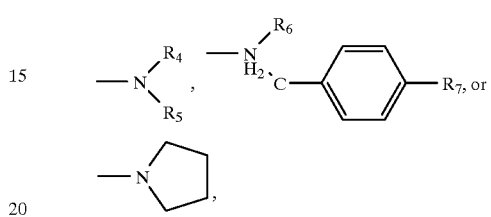

wherein each of $R_4$ and $R_5$ is independently a hydrogen atom, or $C_nH_{2n+1}$, and $R_6$ is a methyl group, and $R_7$ is $C_mH_{2m+1}$, or $OC_mH_{2m+1}$, wherein n is an integer from 1 to 5 and m is an integer from 1 to 8;

(2)

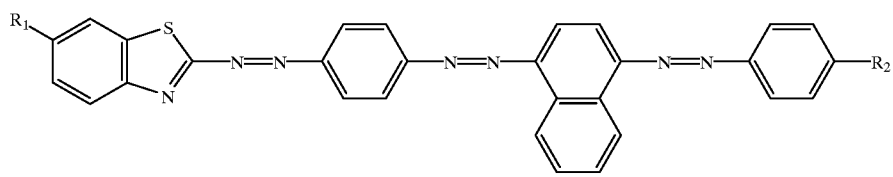

wherein $R_1$ is a hydrogen or halogen atom, $C_nH_{2n+1}$, $OC_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; and $R_2$ is

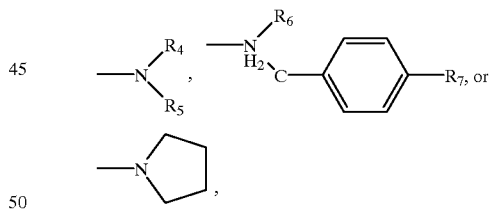

wherein each of $R_4$ and $R_5$ is independently a hydrogen atom or $C_nH_{2n+1}$; $R_6$ is a methyl group; and $R_7$ is $C_mH_{2m+1}$, or $OC_mH_{2m+1}$, wherein n is an integer from 1 to 5, and m is an integer from 1 to 8;

(3)

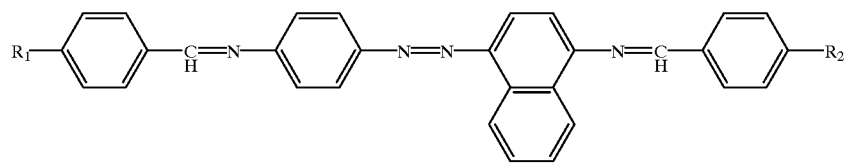

wherein $R_1$ is a hydrogen or halogen atom, $C_nH_{2n+1}$, $OC_nH_{2n+1}$, $COC_nH_{2n+1}$, $OCO_nH_{2n+1}$, $COOC_nH_{2n+1}$, or $CH_2C_nH_{2n+1}$, wherein n is an integer from 1 to 8; and $R_2$ is a hydrogen or halogen atom, $C_nH_{2n+1}$, $OC_nH_{2n+1}$, $COC_nH_{2n+1}$, $OCO_nH_{2n+1}$, $COOC_nH_{2n+1}$, or $CH_2COOC_nH_{2n+1}$, wherein n is an integer from 1 to 8;

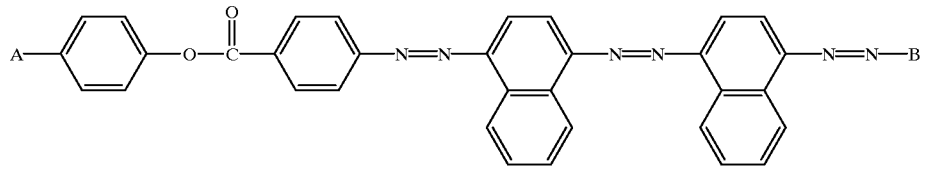

(4)

wherein A is $C_nH_{2n+1}$, or

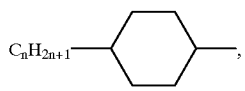

wherein n is an integer from 1 to 8; and B is

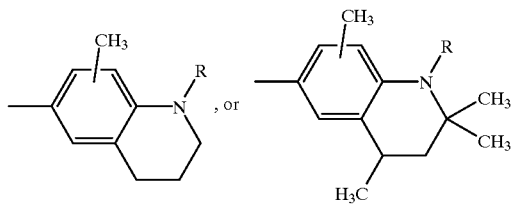

wherein R is $C_nH_{2n+1}$, or $C_nH_{2n+1}OCH_3$, wherein n is an integer from 1 to 8;

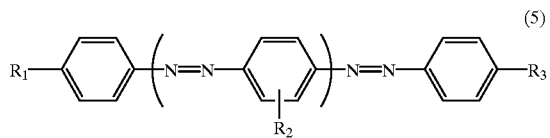

(5)

wherein $R_1$ is $C_nH_{2n+1}$, $OC_nH_{2n+1}$, $COC_nH_{2n+1}$, $OCOC_nH_{2n+1}$, $C_6H_4C_nH_{2n+1}$, $COOC_nH_{2n+1}$, or $CH_2C_nH_{2n+1}$, wherein n is an integer from 1 to 8; $R_2$ is a hydrogen or halogen atom, a linear alkyl group having four or less carbon atoms or a lower alkoxy group; and $R_3$ is

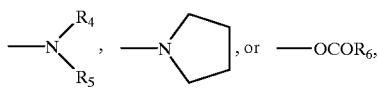

wherein each of $R_4$, $R_5$, and $R_6$ is independently a hydrogen atom or $C_nH_{2n+1}$, wherein n is an integer from 1 to 5.

10. A guest-host liquid crystal display device according to claim 9, wherein said mixture of dichroic dyes are added to said guest-host liquid crystal in an amount of 1.0 to 5.0 percent by weight.

11. A guest-host liquid crystal display device according to claim 9, wherein said guest-host liquid crystal comprises a nematic liquid crystal having a negative dielectric anisotropy, and is aligned perpendicularly to said substrates.

12. A guest-host liquid crystal display device according to claim 11, wherein said nematic liquid crystal comprises a fluorophenylcyclohexane compound.

13. A guest-host liquid crystal display device according to claim 9, wherein a first substrate among said substrates is transparent and lies at the incident side, and a second substrate faces said first substrate and is provided with a reflecting layer and $(2n+1)\lambda/4$ ($n=\pm 0, 1, 2, 3 \ldots$) layers thereon in that order.

14. A guest-host liquid crystal display device comprising:

a pair of substrates opposing each other with a space therebetween;

a guest-host liquid crystal held in said space, said guest-host liquid crystal containing a mixture of dichroic dyes exhibiting a black color as a whole, said mixture of dichroic dyes is present in an amount equal to or less than 5 weight percent; and electrodes provided on said substrates for applying a voltage to said guest-host liquid crystal;

said mixture of dichroic dyes comprising at least a bis-azo dye and a tris-azo dye having a benzothiazole ring represented by the following chemical formula (2), the bis-azo dye selected from the group consisting of a bis-azo blue dye having a thienothiazole ring represented by the following chemical formula (1) and a bis-azo reddish purple dye having a thienothiazole ring represented by the following chemical formula (3);

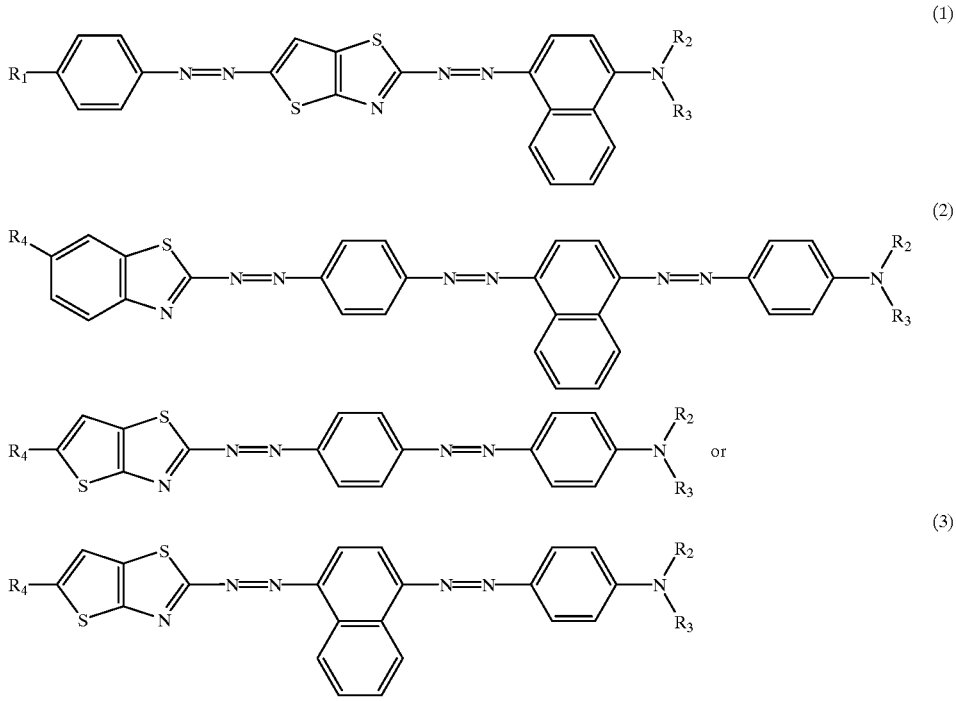

wherein $R_1$ is a hydrogen or halogen atom, $C_nH_{2n+1}$, $COC_nH_{2n+1}$, $OCOC_nH_{2n+1}$, $COOC_nH_{2n+1}$, or $CH_2COOC_nH_{2n+1}$, wherein n is an integer from 1 to 8; each of $R_2$ and $R_3$ is a hydrogen atom or $C_nH_{2n+1}$; $R_3$ may be

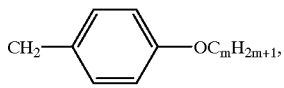

or

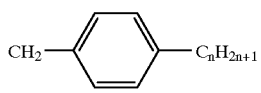

and a combination of $R_2$ and $R_3$ may form

wherein n is an integer from 1 to 8, and m is an integer from 1 to 5; and $R_4$ is a hydrogen or halogen atom, or $C_nH_{2n+1}$, wherein n is an integer from 1 to 8.

15. A guest-host liquid crystal display device according to claim 14, wherein said mixture contains all of said bis-azo blue dye, said tris-azo bluish purple dye, and said reddish purple dye, and further contains an additional dye.

16. A guest-host liquid crystal display device according to claim 14, wherein said mixture of dichroic dyes are added to said guest-host liquid crystal in an amount of 1.0 to 5.0 percent by weight.

17. A guest-host liquid crystal display device according to claim 14, wherein said guest-host liquid crystal comprises a nematic liquid crystal having a negative dielectric anisotropy, and is aligned perpendicularly to said substrates.

18. A guest-host liquid crystal display device according to claim 17, wherein said nematic liquid crystal comprises a fluorophenylcyclohexane compound.

19. A guest-host liquid crystal display device according to claim 14, wherein a first substrate among said substrates is transparent and lies at the incident side, and a second substrate faces said first substrate and is provided with a reflecting layer and $(2n+1)\lambda/4$ ($n=\pm 0, 1, 2, 3 \ldots$) layers thereon in that order.

20. A guest-host liquid crystal composition comprising:

a dichroic dye mixture comprising at least a bis-azo dye and a tris-azo bluish purple dye having a benzothiazole chromophoric group, the bis-azo dye selected from the group consisting of a bis-azo blue dye having a thienothiazole ring chromophoric group, and a bis-azo reddish purple dye having a thienothiazole ring chromophoric group; and a host liquid crystal dissolving said dichroic dye mixture as a guest substance, wherein said dichroic dye mixture is present in an amount equal to or less than 5 percent by weight.

21. A guest-host liquid crystal composition according to claim 20, wherein said host liquid crystal comprises a nematic liquid crystal having a negative dielectric anisotropy.

22. A guest-host liquid crystal composition according to claim 21, wherein said nematic liquid crystal comprises a flurorphenylcyclohexane compound exhibiting a nematic phase at room temperature.

* * * * *